United States Patent
De Arruda Camargo Polido

(10) Patent No.: US 11,534,923 B1
(45) Date of Patent: Dec. 27, 2022

(54) ROBOTIC MANIPULATION AND FRAME SENSOR PLACEMENT FOR IN-MOTION OBJECT MODELING AND IDENTIFICATION

(71) Applicant: Amazon Technologies, Inc., Seattle, WA (US)

(72) Inventor: Felipe De Arruda Camargo Polido, North Reading, MA (US)

(73) Assignee: Amazon Technologies, Inc., Seattle, WA (US)

(*) Notice: Subject to any disclaimer, the term of this patent is extended or adjusted under 35 U.S.C. 154(b) by 329 days.

(21) Appl. No.: 16/708,153

(22) Filed: Dec. 9, 2019

(51) Int. Cl.
  *B25J 9/16* (2006.01)

(52) U.S. Cl.
  CPC ........... *B25J 9/1697* (2013.01); *B25J 9/1674* (2013.01)

(58) Field of Classification Search
  CPC ................. B25J 9/1697; B25J 9/1674; G05B 2219/40543; G06T 17/00
  See application file for complete search history.

(56) References Cited

U.S. PATENT DOCUMENTS

| | | | | |
|---|---|---|---|---|
| 9,227,323 B1* | 1/2016 | Konolige | ................ | B25J 9/1697 |
| 11,027,923 B1* | 6/2021 | Mohammed | ......... | B65G 11/081 |
| 2015/0027934 A1* | 1/2015 | Johnston | ............... | B65G 47/46 |
| | | | | 209/606 |
| 2018/0333749 A1* | 11/2018 | Wagner | .................... | B65B 5/101 |
| 2021/0129340 A1* | 5/2021 | Babikian | .................. | B25J 15/00 |
| 2022/0063111 A1* | 3/2022 | Wong | ..................... | B25J 9/1612 |

* cited by examiner

Primary Examiner — Robert T Nguyen
(74) Attorney, Agent, or Firm — Lee & Hayes, P.C.

(57) ABSTRACT

A package imaging system can be configured to utilize unused or idle degrees of freedom associated with a robot to collect identification and modeling information. One or more sensors can be attached to the robot and configured to track a package between a first location and a second location. A final joint of the robot can be configured to cause one or more rotations of the package within the reference frame. The one or more sensors can capture one or more images of the package within the reference frame. Based on the one or more images, the package imaging system can determine a package identity from an identifier associated with the package. The package imaging system can also generate a three-dimensional model of the package by combining the one or more pictures.

20 Claims, 7 Drawing Sheets

ROBOTIC MANIPULATION AND FRAME SENSOR PLACEMENT FOR IN-MOTION OBJECT MODELING AND IDENTIFICATION

BACKGROUND

With the increase of customers placing orders for the delivery of items (e.g., products), the number of packages delivered to customers continues to increase. This results in companies seeking to optimize operations related to the delivery of packages and to increase the efficiency of systems utilized in the packaging and delivery process. Currently, various robotic systems are utilized to distribute packages to various endpoints within a distribution system. In particular, robots can be configured to extract the packages from a package source and place the packages at a package destination. Additionally, the packages can be monitored by the distribution system via scanning tunnels that request intermediate waypoints where the package is moved into the scanning tunnel, rotated, and the removed from the scanning tunnel. However, such scanning tunnels require additional operating space, equipment, and time to appropriately identify and model the packages within the distribution system. This can result in additional costs associated with the scan tunnel systems, additional computing resources (e.g., processing time, CPU usage, etc.), and unnecessary efficiency costs for the distribution facility.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
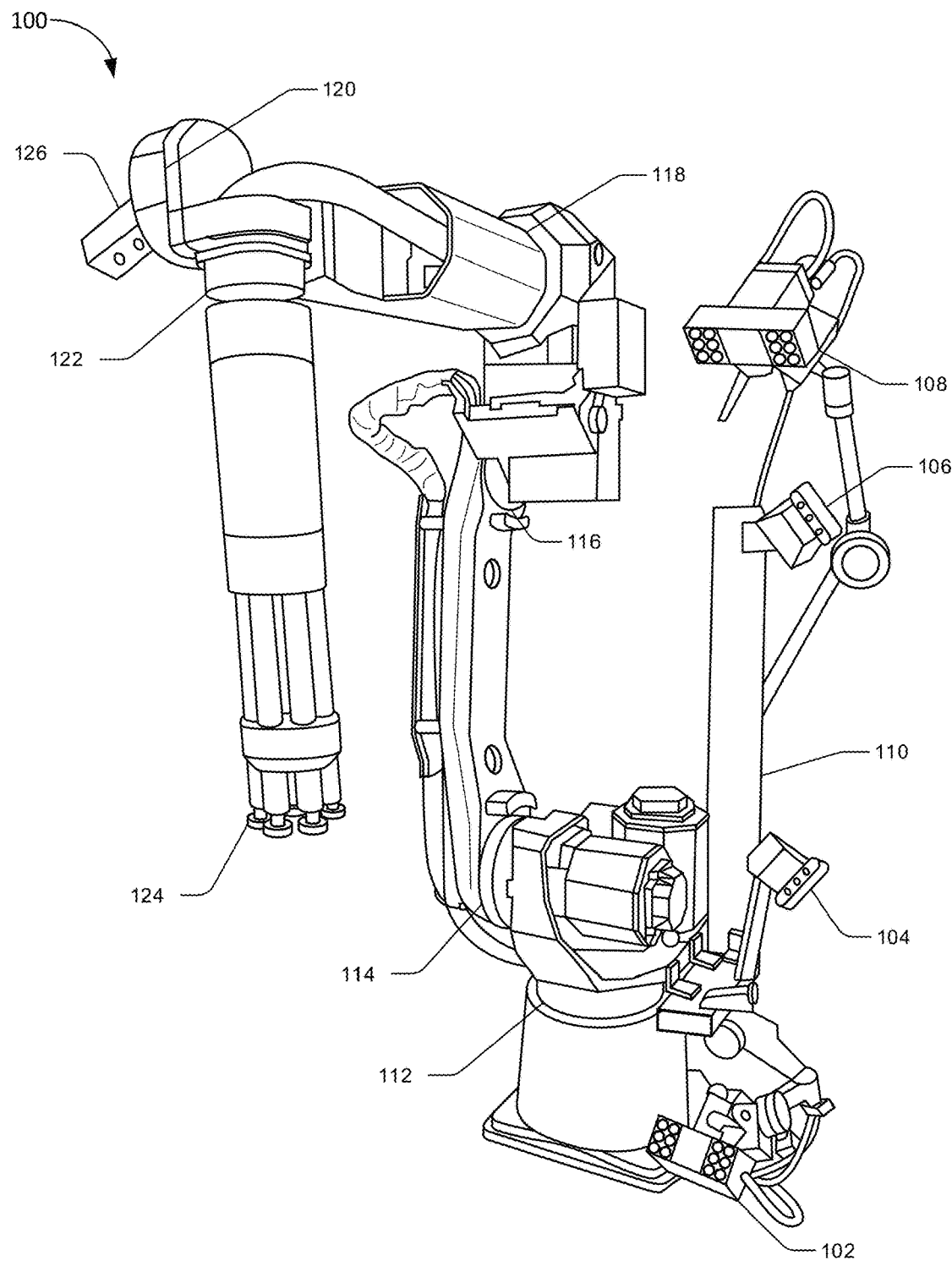
FIG. 1 illustrates an example system for imaging a package held by a robot during transit between a first location and a second location by utilizing a motion axis of the robot and one or more sensors attached to a second motion axis of the robot.

Described herein are systems and/or processes for identifying and modeling packaged items and packages that are handled by a robot associated with a distribution system. In some embodiments, a system can be implemented that monitors a fixed imaging frame or a reference frame associated with at least a final joint or a final motion axis of the robot. Additionally, the final joint or the final motion axis can manipulate the package such that the system is able to image the package from multiple perspectives at different times. Further, the system can be configured to identify the package and verify the location of the package within the distribution system while the package is moved from a package source to a package destination. In particular, by monitoring the fixed imaging frame or the reference frame associated with the robot while the robot is transporting the package from a first location to a second location, the system can eliminate the need for a scanning system that is independent from the mechanism that picks and places the package, which may increase the overall efficiency of the distribution system. Accordingly, the system can be configured such that one or more sensors repeatedly capture a set of images as the package is rotated during the pick and place operation by the robot.

In some embodiments, the robot can comprise one or more degrees of freedom that are each associated with a range of motion or a motion axis. In particular, a degree of freedom can be associated with a rotational motion axis (i.e., rotating around a fixed point) or a linear motion axis (i.e., extending and retracting in a single direction). Additionally, the robot can be configured to utilize the one or more degrees of freedom to move a packaged good from a first location (e.g., a package source, such as a bin, container, a moveable robot, or conveyor belt) to a second location (e.g., a package destination, such as a second bin, container, mobile robot, or conveyor belt). Further, the robot can be configured to include a component capable of attaching to or grasping the package at the first location and detaching or releasing the package at the second location.

In some embodiments, the system can comprise one or more sensors configured to repeatedly capture one or more images of the package. In particular, the one or more sensors can be attached to a joint or a motion axis other than the final joint (i.e., the final motion axis) of the robot. Additionally, the one or more sensors can be configured to capture the one or more images of the package within the reference frame. The reference frame can comprise a region or a space that is observed by the one or more sensors, where the reference frame is within a field of view of the sensor(s). Further, the robot can be configured such that the final joint manipulates the package within the reference frame during movement/transport of the package, by the robot, between the first location (i.e., the package source) and the second location (i.e., the package destination). In at least one embodiment, the final joint of the robot can be a rotational joint capable of rotating the package 360° such that the one or more sensors are able to capture images of the surface of the package from multiple perspectives and angles. In at least one additional embodiment, the final joint of the robot can be a rotational joint capable of rotating the package less than a full rotation (e.g., 60°, 90°, 180°, 270°, 300°, 330°, etc.)

such that the one or more sensors are able to capture images of the surface of the package from multiple perspectives and angles.

Additionally, the robot can be configured to perform a 360° rotation of the package during the movement of the package from the first location to the second location. In general, the final joint can perform one or more full rotations of the package within the reference frame, wherein a full rotation can be a single 360° rotation around an axis of the final joint or a combination of partial rotations relative to a reference point (i.e., a 180° counterclockwise rotation relative to a neutral position of the final joint, a return rotation to the neutral position, and a 180° clockwise rotation relative to the neutral position). In at least one additional embodiment, the robot can be configured to return the final joint to the reference frame after attaching to or grasping the package at the first location and prior to releasing the package at the second location. In at least one further embodiment, the reference frame can be configured such that the final joint can be observed by the one or more sensors during the motion from the first location to the second location. Accordingly, the final joint of the robot can be utilized by the system to capture a sequence of images as the package is rotated by the final joint independent of the overall movement of the robot between the first location and the second location.

In some embodiments, the one or more sensors can be attached to the robot at a first joint. In particular, the robot can include the final joint, one or more connecting joints, and the first joint, wherein the first joint controls the motion of the robot relative to a support for the robot (e.g., a floor, a wall, a ceiling, a support frame, a rail, etc.). Additionally, an individual joint can apply motion to one or more subsequent joints (i.e., a third joint, a fourth joint, a fifth joint (or any other number of joints), and the final joint for a second joint) along a motion axis (e.g., rotational or linear). Similarly, one or more prior joints (i.e., the first joint for the second joint) can apply motion to the individual joint and the one or more subsequent joints. Accordingly, where the one or more sensors are attached to the first joint, a first motion caused by the first joint is not observable by the one or more sensors due to the first motion being applied to the one or more subsequent joints (i.e., the final joint and the one or more connecting joints) and the one or more sensors. Further, the first joint can cause the reference frame to track the first motion of the robot. For example, the first motion can comprise a 90° rotation around an axis of the first joint and can cause the reference frame to travel along a 90° arc around the axis such that a position of the reference frame is fixed relative to the axis of the first joint. In this example, the one or more connecting joints and the final joint also travel along the 90° arc and appear motionless within the reference frame.

However, it should be noted that movement of the final joint, the one or more connecting joints, and the one or more sensors can be tracked within the reference frame. For example, while the reference frame travels in the 90° arc, a final joint motion can cause the one or more sensors to observe a 360° rotation of the final joint within the reference frame. Accordingly, a second motion caused by the final joint and/or the one or more connecting joints is observable by the one or more sensors due to the reference frame not tracking the second motion. In some additional embodiments, the one or more sensors can be attached to the second joint such that the reference frame is fixed relative to both the first joint and the second joint. As discussed above, movement of the first joint and the second joint will be applied to the reference frame and not be observed by the reference frame. It should be noted that stating that motion is not observed by the reference frame indicates that the sensors do not detect movement of the one or more subsequent joints within the reference frame. However, the motion caused by the first joint and the second joint causes the one or more sensors to move relative to the environment surrounding the robot. Accordingly, the one or more sensors can observe motion of the first joint and the second joint relative to the environment of the robot. Additionally, the one or more sensors can be attached to the individual joint In at least one embodiment, the one or more sensors can be attached to a joint of the robot such that the final joint is the only subsequent joint relative to the joint.

In some embodiments, and as noted above, a joint of the robot can comprise a neutral position or a zero position that represents a reference point for movement performed by the joint and/or a rest position that the joint returns to when a movement cycle or a task is completed. It should be noted that the neutral position, the zero position, and/or the rest position for the robot can refer to a position that the one or more joints of a robot return to after performing an operation. For example, the one or more joints of the robot can start a remove package cycle in the rest position, remove the package from the package source, and return to the rest position. Similarly, the one or more joints of the robot can start a deposit package cycle in the rest position, deposit the package at the package destination, and return to the rest position. Additionally, the joint of the robot can cause the robot to rotate between a first position (i.e., a position aligned to the package source) and a second position (i.e., a position aligned to the package destination) while each of the one or more connecting joints are in the rest position. Any movement along the motion axis associated with the joint and/or the one or more joints can be defined as positive or negative movement relative to the neutral position (i.e., the zero position or the rest position) for the joint. Further, the movement of the joint can be associated with a force and/or a torque that was applied by the joint (e.g., a motor associated with the joint applies an amount of force to the joint) to move from a first position to a second position. In at least one embodiment, physical dimensions for each joint of the robot can be utilized by the system to determine an overall neutral position for the robot or for the one or more subsequent joints relative to the joint where the one or more sensors are attached. For example, the physical dimensions can include an arm length and a connection angle associated with the one or more joints of the robot. Accordingly, the system can determine the overall neutral position for the robot based on the physical dimensions and the neutral position for each of the one or more joints. In some additional embodiments, the system can receive one or more indications from the robot that include the force/the torque applied by each joint of the robot over time. Additionally, the system can determine, based on the neutral position for each joint of the robot, a movement and a new position of the joint. Further, the system can determine the new position of the joint based on the force/the torque applied by the joint and one or more prior joints. Accordingly, the system can determine a final position of the final joint based on one or more positions and the physical dimensions of the one or more prior joints. The final position can be tracked by the system relative to the environment of the robot, the reference frame of the one or more sensors, and/or the individual joint where the one or more sensors are attached.

In some embodiments, the system can be configured to collect images, dimensioning scans, modeling scans, and weight measurements associated with the package. In particular, the system can determine at least a barcode, one or more dimensions, a three-dimensional model, and a weight associated with the package. Additionally, the system can determine a position, a force, and a torque associated with one or more joints of the robot (e.g., the first joint, the one or more connecting joints, the final joint, etc.). In at least one embodiment, the system can identify an indicator, within the reference frame, that is associated with the final joint. The indicator can enable the system to determine a position of the final joint relative to the one or more joints of the robot and a neutral position of the final joint. For example, the indicator can enable the system to determine an amount of positive or negative rotation the final joint has performed relative to the neutral position in the range of motion for the final joint. Further, the indicator can be utilized by the system to determine a motion caused by the final joint and track the motion as the one or more sensors collect data regarding the package. Alternatively, the indicator can be utilized by the system to determine the motion caused by the one or more joints, based on the movement of the indicator within the reference frame, and track the motion as the one or more sensors collect the data. Accordingly, the system can determine a package position and a package orientation associated with the package associated with the data captured by the one or more sensors.

In at least one additional embodiment, the system can identify the package position and the package orientation based on the position, the force, and/or the torque associated with each of the one or more joints. Additionally, the system can receive a previous package position during a previous data capture event, an amount of applied torque and/or applied force since the previous data capture event, and measurements associated with each of the one or more joints. Further, the system can determine the package position and the package orientation based on the previous package position, the applied torque and/or the applied force, and the measurements. Accordingly, the system can be configured to model the motion of the package in the three-dimensional space of the reference frame and/or the environment based on information obtained from the robot.

In at least one further embodiment, the system can determine a package pose, or the package position and the package orientation, based on a kinematic state of the robot. In other words, the kinematic state can represent the instantaneous position of all the joints that comprise the robot at an individual point in time. Forward kinematics can be utilized by the system to determine the package pose from the kinematic state of the robot. Similarly, inverse kinematics can be utilized by the system to determine the kinematic state of the robot or a joint of the robot from the package pose detected by the one or more sensors. In particular, the kinematic state of the robot can be detected utilizing one or more encoders to calculate the position and velocity for the one or more joints of the robot. Additionally, the encoders can be utilized to read a position of an associated joint directly or integrate velocity over time to determine a new joint state, and a new kinematic state for the robot, after an interval. For example, the encoder can be a linear variable differential transformer that determines linear displacement along an axis. Alternatively, an optical encoder can be utilized to detect joint motion for determining the kinematic state of the robot.

In some embodiments, the one or more sensors can be configured to repeatedly capture images of the reference frame. In particular, the one or more sensors can include one or more cameras, barcode scanners, dimensional scanners, infrared sensors, laser scanners, LIDAR scanners, and/or other imaging sensors. Accordingly, the images captured by the one or more sensors can include visual depictions of the package, two-dimensional (2D) RGB images, detected barcodes, 3D scans of the package, LIDAR scans of the package, and other representations of the package captured by the one or more sensors. Additionally, the images captured by the one or more sensors can be analyzed to identify a barcode, determine one or more dimensions, and/or generate a three-dimensional model associated with the package in the images. In at least one embodiment, the one or more sensors can be configured to observe the package from multiple perspectives or angles (e.g., a top-down perspective and a bottom-up perspective). Additionally, the multiple perspectives can be independently analyzed to determine information such as the barcode or the one or more dimensions. Alternatively, the multiple perspectives can be combined and subsequently analyzed by the system. In at least one additional embodiment, the one or more sensors can be configured to capture images of the reference frame before the robot retrieves the package or after the robot releases the package. In particular, the system can be configured to monitor the reference frame and determine that a package has been retrieved from the first location (i.e., the package source) and deposited at the second location (i.e., the package destination). In at least one further embodiment, the system can detect and utilize one or more visual cues associated with the package and identify the package and the item associated with the package based on a catalog or a database that associates one or more items with one or more item specific visual cues. For example, the package can contain an item and include a label that is associated with the item. Accordingly, the system can determine, based on the one or more images, that the package contains the item based on detecting the visual cue of the label that is associated with the item within the catalog or the database. Additionally, the visual cues can include other distinguishing visual features including a package color, a package shape, text on a surface of the package, and other identifying features listed by the catalog or the database as associated with a particular item.

In some embodiments, the one or more sensors (e.g., cameras, scanners, etc.) can be attached to the robot at multiple joints. For example, a first sensor can be attached to the first joint of the robot while a second sensor can be attached to the second joint of the robot. Additionally, the one or more sensors can be mounted in the environment surrounding the robot. In general, the one or more sensors can be attached to the robot at any location or at any combination of locations necessary to observe the package between the first location and the second location.

Without the systems and techniques described herein, a distribution system or other robotic systems would be forced to incorporate unnecessary inefficiencies to identify, model, and track packages. As noted above, current distribution systems include scanning tunnels for identifying, modeling, and tracking packages throughout the process of package handling within the distribution system. Generally, a scanning tunnel disrupts a workflow by requiring an imaging step where the package must be moved into the scanning tunnel. Instead of moving a package directly from a first location to a second location, a robot must move the package into a scanning tunnel and rotate the package within the scanning tunnel before removing the package from the scanning tunnel and depositing the package at the second location. The disruption caused by the scanning tunnel unnecessarily extends the cycle time associated with the robot and decreases overall equipment efficiency (OEE) for the distribution system. Alternatively, the scanning tunnel disrupts the workflow by requiring the package to be placed upon a conveyor belt and imaged by a series of sensors associated with the scanning tunnel. Once the item passes through the scanning tunnel, the robot then retrieves the package and deposits the package at the second location. Accordingly, the scanning tunnel decreases the OEE for the distribution facility and the extends the cycle time associated with the robot by introducing the intermediate handling point where the package must be deposited and recovered before being placed at the second location.

Accordingly, the described systems utilize one or more motion axis (i.e., degrees of freedom) associated with the robot to image the packages during direct motion from the first location and the second location. This reduces the cycle time of the robot, removes extraneous robot motions, and eliminates the unnecessary step of the scanning tunnel from the distribution system as a whole. For example, a distribution station can include a robot associated with the described system and the described techniques. Additionally, and for the purposes of this discussion, assume that the distribution station can be configured to exceed a package processing rate of 750 units (i.e., packages) per hour and operate with a cycle time, for the robot/the item manipulation station, of less than 4.8 seconds. In this scenario, the addition of a scanning tunnel to the distribution station can add a second to the cycle time of the robot and slow the package processing rate from 750 units per hour to 620 units per hour (i.e., a 17% reduction). As the package processing rate increases, the second of added cycle time causes increasing inefficiencies. For example, where the package processing rate is 1000 units per hour, the second of added cycle time reduces the package processing rate to 780 units per hour (i.e., a 22% reduction). Accordingly, utilization of otherwise idle degrees of freedom on the robot to identify and model packages within a distribution system can result in greater efficiency than utilizing a scanning tunnel to perform similar tasks.

FIG. 1 illustrates an example system for imaging a package held by a robot 100 during transit between a first location (i.e., a package source, such as a bin, container, conveyor belt, etc.) and a second location (i.e., a package destination, such as a second, bin, container, conveyor belt, etc.) by utilizing a final motion axis of the robot 100 and one or more sensors attached to an additional motion axis of the robot 100. In particular, FIG. 1 displays one or more sensors of a system that are attached to and/or associated with the robot 100. Additionally, while FIG. 1 displays a particular configuration of the robot 100, the systems and methods discussed below can be applied to any generic robot that includes at least a motion axis associated with a joint. Further, the robot 100 can include a fixed position mount (e.g., the robot 100 can be connected to a single position on a floor, a wall, a ceiling, a support structure, etc.) or a mobile mount. For example, the mobile mount can permit the robot 100 to move along a rail or track in a single direction, in a two-dimensional plane, or within a three-dimensional space. In other embodiments, the robot 100 can move around a surface using wheels, conveyors, pneumatic systems, hydraulic systems, and the like.

In some embodiments of FIG. 1, the system can comprise one or more sensors including a first scanner 102, a first sensor 104, a second sensor 106, and a second scanner 108. Additionally, each of the one or more sensors can be implemented as a scanner, a camera, or an imaging sensor. It should be noted that, while four scanners/sensors are illustrated in FIG. 1, the system can include as few as a single scanner and/or sensor or additional scanners/sensors not illustrated by FIG. 1. In at least one embodiment, the first scanner 102 and the second scanner 108 can be implemented as barcode scanners configured to detect one or more barcodes on a package associated with the robot 100. In at least one additional embodiment, the first sensor 104 and the second sensor 106 can be implemented as dimensioning sensors configured to collect a plurality of dimensioning scans of the package associated with the robot 100. In at least one further embodiment, the one or more sensors can be configured to observe and capture an image of an identifier associated with a package within a reference frame. In particular, the identifier can allow the system to identify the package or a content of the package (e.g., an item, such as a toy, a book, electronic equipment, sporting equipment, a cooking utensil, clothing, etc.). For example, the identifier can be a barcode, a label, a Quick Response (QR) code, or other identifying feature that the one or more sensors can detect and/or recognize on the package.

In some additional embodiments, the first scanner 102, the first sensor 104, the second sensor 106, and the second scanner 108 can be attached to a system support 110. In particular, the system support 110 can provide a shared support for the one or more sensors such that motion is simultaneously applied to the one or more sensors. Additionally, the system support 110 can include individual sensor supports that allow a field of view associated with each of the one or more sensors to be independently configured. Accordingly, the system support 110 can be configured to maintain multiple perspectives for the one or more sensors (e.g., a first perspective associated with the first scanner 102 and a second perspective associated with the second scanner 108). In at least one embodiment, the first scanner 102 and the first sensor 104 can be configured to have a first field of view to capture one or more first images associated with a bottom surface and one or more side surfaces of the package. Similarly, the second sensor 106 and the second scanner 108 can be configured to have a second field of view capture one or more second images associated with a top surface and the one or more side surfaces of the package. It is contemplated that the scanners and the sensors may be placed in any location associated with the robot 100 and in any orientation.

In some further embodiments, the multiple perspectives associated with the one or more sensors (e.g., the first field of view and the second field of view) can be configured to form a reference frame, wherein the reference frame is a region or a space that is continuously observed by the one or more sensors, such that the reference frame is within a field of view of the sensor(s). In at least one embodiment, the one or more sensors and the system support 110 can be configured such that the reference frame is fixed relative to one or more joints of the robot 100. In particular, and as noted above, the system support 110 can attach the one or more sensors to an individual joint (e.g., a first joint 112). Accordingly, the reference frame observed by the one or more sensors attached to the individual joint is fixed in relation to the individual joint and motion of the first joint 112 will cause a proportional movement of the reference frame. For example, if the reference frame is fixed relative to a rotational joint of the robot 100, a 90-degree rotation of the rotational joint can cause the reference frame to travel in a 90-degree arc around a central axis of the rotational joint and at a fixed distance from the rotational joint. Similarly, if the reference frame is fixed relative to a linear joint of the robot 100, an extension of the linear joint will cause the reference frame to travel the same distance and in the same direction as the extension of the linear joint. Accordingly, positions within the reference frame can be defined based on a coordinate system (e.g., Euclidean, Spherical, etc.) associated with the one or more joints of the robot 100 and motion of the coordinate system can cause a proportional motion of the reference frame. In at least one additional embodiment, the one or more sensors and the system support 110 can be configured such that the reference frame is fixed relative to the environment of the robot 100. Additionally, motion associated with the one or more joints of the robot 100 will not cause the reference frame to shift, but instead can cause observable motion to occur within the reference frame. Further, the reference frame can be configured as a fixed reference frame relative to a world coordinate system (e.g., the x, y, and z axis of the environment).

In some embodiments, the one or more joints associated with the robot 100 can comprise the first joint 112, a second joint 114, a third joint 116, a fourth joint 118, a fifth joint 120, and a sixth joint 122. Additionally, the robot 100 can be configured as a six degree of freedom robot, wherein each of the one or more joints is associated with a motion axis and a degree of freedom. In at least one embodiment, a degree of freedom is a defined mode and/or motion axis in which the robot 100 can move. Additionally, the total degrees of freedom (e.g., six degrees of freedom) is equal to a number of independent displacements and/or motion axis of the robot 100. In at least one additional embodiment, the robot 100 can be configured to include fewer than six degrees of freedom so long as a degree of freedom can be utilized to maneuver or manipulate a package within the reference frame while the package is moved from the first location to the second location. In at least one additional embodiment, the robot 100 can be configured to include greater than six degrees of freedom. For example, the robot 100 can include a seventh joint in addition to the one or more joints. Alternatively, the robot 100 can include a rail or a track that enables the robot to move within the environment.

In some embodiments, and as illustrated by FIG. 1, the system support 110 can be attached, mounted, and/or affixed to the first joint 112. Additionally, the system support 110 can be attached to the first joint 112 such that motion caused by the first joint 112 relative to the environment is applied to the system support 110, the one or more sensors, and one or more subsequent joints (e.g., the second joint 114, the third joint 116, etc.). In some additional embodiments, the system support 110 and the one or more sensors can be attached to any of the one or more joints associated with the robot 100. Additionally, one or more subsequent joints can be defined as joints that manipulate the package relative to the joint where the one or more sensors are attached. Further, one or more prior joints can be defined as the joints that manipulate the joint, the one or more subsequently joints, and the one or more sensors relative to the environment. Accordingly, motion caused by the one or more subsequent joints can be observed and tracked within the reference frame while motion caused by the one or more prior joints is not observed within the reference frame. In some further embodiments, the sixth joint 122 is a final joint 122 associated with the robot 100. In particular, the final joint 122 can be configured to manipulate the package within the reference frame observed by the one or more sensors. In at least one embodiment, the final joint 122 is a rotational joint configured to rotate the package within the reference frame such that the one or more sensors observe one or more surfaces of the package. It should be noted that a portion of the one or more surfaces can be occluded or blocked from observation by the one or more sensors due to an attachment component 124 of the robot 100.

In some embodiments, the attachment component 124 can be configured to secure the package between the first location, where the attachment component 124 secures the package to be moved by the robot 100, and the second location, where the attachment component 124 releases the package. Additionally, the attachment component 124 can cause the one or more systems to not observe the identifier (e.g., a barcode, a label, etc.) associated with the package. Accordingly, the robot 100 can include a supplemental sensor 126 configured to observe the package after the robot 100 has released the package at the second location. Further, the supplemental sensor 126 can be configured to capture the identifier associated with the package where the one or more sensors failed to observe the identifier within the reference frame. In at least one embodiment, the attachment component 124 can include a pneumatic system or hydraulic system associated with a vacuum nozzle or a suction attachment, that adheres to the surface of the package. The attachment component 124 may also be configured to grasp the package using one of or more fingers that apply force to the package, and then release the package by reducing the amount of force applied to the exterior surface of the package.

In some additional embodiments, the robot 100 can be configured to remove packages from a first location, such as a storage container, and transfer the packages to a second location, such as a conveyor belt. The packages can be gathered from a warehouse and routed to different endpoints within a distribution facility and ultimately shipped to a customer. In particular, the customer can place an order, specify a destination, and select a shipping timeframe for a product. The product requested by the order can be stored within the warehouse and can be prepackaged or unpackaged. Accordingly, the product, or a package comprising the product, can be placed within or delivered to the first location. In at least one embodiment, the product can be collected from the warehouse and provided to a packaging system that is, relative to the robot 100, upstream within the distribution facility. Accordingly, the package including the product can be received at the first location from the upstream system(s). It should be noted, that in some alternative embodiments, the product can be placed within the first location (i.e., deposited by a distribution facility worker after being collected from the warehouse) and the robot 100 can place the product at the second location, wherein the second location is associated with the packaging system (i.e., the packaging system can be downstream from the robot 100). Regardless of how the package arrives at the first location, the robot 100 can be configured to lower or move the final joint 122 into the first location and remove the package from the first location (e.g., securing the package to the final joint 122 with suction or a grasping mechanism). Once the robot 100 has removed the package from the first location, the robot 100 can return the final joint 122 to a neutral position and rotate, via at least the first joint 112, from the first location to the second location. Upon completing the rotation of the first joint 112, the final joint 122 can either release the package at the second location or lower the package onto the second location before releasing it. Additionally, once the package is deposited or released at the second location, the robot 100 can return the final joint 122 to a neutral position and return, via the first joint 112 to the first location to remove another package.

In at least one additional embodiment, the robot 100 can be configured to capture one or more images of the package during transfer between the first location and the second location. In particular, the one or more images can be captured by the first scanner 102, the first sensor 104, the second sensor 106, and/or the second scanner 108. Additionally, an imaging and modeling system associated with the robot 100 can be configured to receive the one or more images, determine an identify of the package, identify the product within the package, and/or generate a model of the package. The package can be identified based on the one or more images, dimension information obtained from the model, and/or weight information determined based on a scale associated with the first location or on operating information associated with the robot 100. Further, the identity of the package can be confirmed by determining that an identifier associated with the package, the dimension information, and the weight information match stored information associated with the package within a database. Accordingly, the system can determine that the identity of the package matches the stored information and cause the robot 100 to place the package at the second location. Alternatively, the system can determine that the identity of the package (i.e., the identifier, the dimension information, and/or the weight information) does not match the stored information and can update the stored information and/or how the package is routed within the distribution system.

In at least one further embodiment, the robot 100 can be configured to place the package at the second location. In particular, the after the imaging and modeling system determines the identity of the package, and the product within the package, the system can update the database with the current location of the package, the second location where the package is placed, and a next system that will receive the package (i.e., the downstream system associated with the second location). The downstream system(s) can be associated with an endpoint (i.e., a final system or location within the distribution facility) that is specific to a class of packages, wherein the class of packages can be defined based on the shipping timeframe and/or shipping information related to the destination for the product. For example, the customer can specify that the package is to be delivered domestically, to a location outside of a region associated with the distribution facility, with a shipping timeframe of two days. Accordingly, the endpoint for domestic two-day shipping to the different region can be preceded by downstream systems including a postage system that applies postage to the package, an additional packaging system that collects and associates the package and one or more other packages that are to be shipped out of the region, a storage system that stores the package until shipping, and/or a loading system that loads the package onto a delivery vehicle.

It should be noted that the robot 100 can be associated with the second location and a third location. The robot 100 can place packages that have been correctly identified by the system and properly routed by the upstream system(s) at the second location so that the package is routed to the endpoint assigned and listed by the database for the package. In comparison, packages that cannot be identified or that are determined to have conflicts between the identifier, the dimensions, and/or the weight associated with the package in the database can be placed at the third location. Additionally, packages that are determined to be damaged, missing a label or the identifier, or otherwise include a defect can also be placed at the third location. Accordingly, the third location can be associated with a quality assurance system that is configured to replace the package (e.g., a flawed package, a damaged package, an empty package, etc.), dispose of the package, relocate the package (e.g., a mislabeled package, an improperly sorted package, etc.) to a correct series of downstream systems, or otherwise address the recognized flaw or damage associated with the package. It should be additionally noted that the package can also be flagged by the system and placed at the second location such that a downstream system associated with the quality assurance system can remove the package and place it within the quality assurance system.

Figure 2:
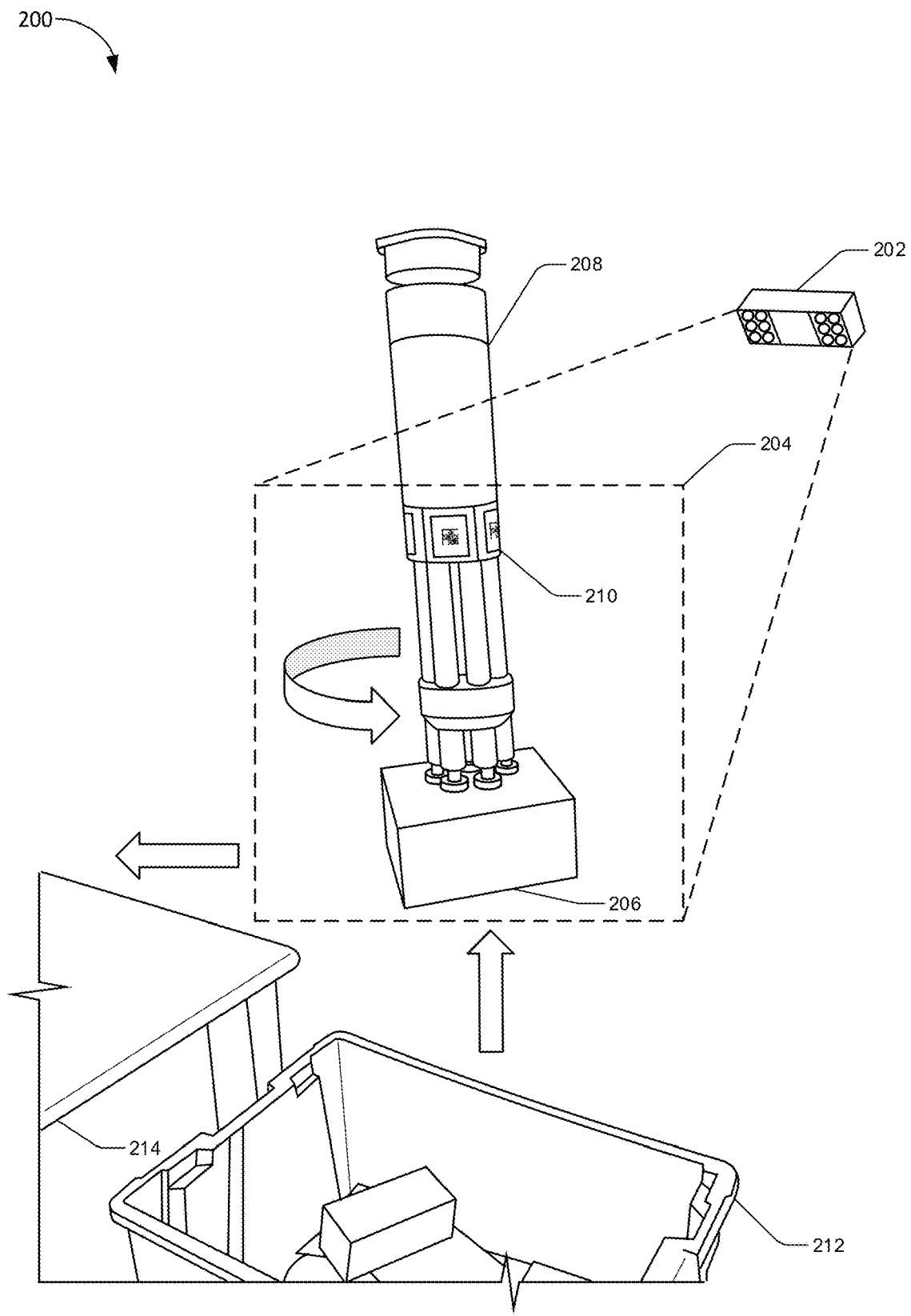
FIG. 2 illustrates an example system for utilizing a robot to retrieve a package from a first location, move the package through a reference frame associated with a sensor, and depositing the package at a second location.

FIG. 2 illustrates an example system for utilizing a robot to retrieve a package from a first location, move the package through a reference frame associated with a sensor, and depositing the package at a second location. In particular, a system 200 can be associated with and/or comprise a sensor 202 configured to observe a reference frame 204. Additionally, the sensor 202 can capture an image or a series of images of a package 206 as a position of the package 206 is manipulated within the reference frame 204 by a final joint 208 that is associated with a robot 100, and as the package 206 is moved through the reference frame 204 by the robot 100. In some embodiments, an indicator 210 can be associated with the final joint 208 and enable the system 200 to track, using the sensors and/or scanners of the robot 100, the final joint 208 and the package 206 within the reference frame 204. In at least one embodiment, the indicator 210 can be a QR code, a motion capture marker, or some other visual cue that indicates a position and/or an orientation of the final joint 208.

In some embodiments, the system 200 can be configured to monitor, via the sensor 202, the reference frame 204. Additionally, the system 200 can be configured to cause the sensor 202 and the reference frame 204 to track the motion of the robot 200 as the package 206 is moved between a first location 212 (i.e., a package source) and a second location 214 (i.e., a package destination). In some embodiments, the first location 212 may correspond to a location at which packages are placed prior to transport and imaging by the robot. For instance, the first location 212 may include a first bin, a first container, or a first conveyor belt. Moreover, the second location 214 may correspond to a location at which packages are placed by the robot. The second location 214 may include a second bin, a second container, or a second conveyor belt that transports the packages to a different location, potentially for shipment or delivery to a destination address. In general, the robot is configured to repeatedly transfer packages between the first location 212 and the second location 214 by traveling within a volume of space along a path that can include minor variations caused by the robot retrieving and depositing the package 206. Accordingly, the sensor 202 is attached to the robot such that the reference frame 204 encompasses the package 206 along the path taken by the robot between the first location 212 and the second location 214. In at least one embodiment, the reference frame 204 tracks the package 206 along the path without causing the robot to deviate from the path. In at least one additional path, the path is an optimal path that is determined to require a shortest cycle time required for the robot to retrieve the package 206 from the first location 212 and deposit the package 206 at the second location 214.

In some embodiments, the system 200 can determine whether the package 206 has been retrieved by the robot and is attached to the final joint 208 associated with the robot. In at least one embodiment, the system 200 can monitor the reference frame 204 by receiving one or more images from the sensor 202. Additionally, the system 200 can analyze the one or more images to determine that the final joint 208 has moved the package 206 from the first location 212 into the reference frame 204. In at least one additional embodiment, the system 200 can determine that the final joint 208 is attached to the package 206 based on one or more operating variables associated with the robot. In particular, the system 200 can receive the one or more operating variables from the robot and determine a force and/or a torque associated with one or more joints of the robot. Additionally, the system 200 can identify a variation of the force and/or the torque required to move the one or more joints of the robot and determine that the package 206 has been retrieved or deposited by the final joint 208 based on the variation. Alternatively, the system 200 can determine a velocity or acceleration associated with the one or more joints, identify an additional variation of the velocity or the acceleration, and determine that the package 206 has been retrieved or deposited by the final joint 208 based on the second variation. Due to the natural relationships of force, torque, velocity, and acceleration, receiving an indication of one operating variable can permit the system 200 to determine the one or more operating variables based on physical dimensions (e.g., arm length of the one or more joints), mass, and travel time of the one or more joints between the first location 212 and the second location 214.

In some embodiments, the system 200 can determine a package position and a package orientation associated with the package 206. In at least one embodiment, the package position refers to a location of the package and/or a volume of space occupied by the package 206 within the reference frame 204. The package position can be determined based on a distance between the indicator 210 and an end of the final joint 208. Additionally, the package position can be determined based on the system 200 detecting the package 206 within the reference frame 204. Further, the package position can be determined based on the physical dimensions of the one or more joints and the system 200 calculating an endpoint of the final joint 208. Accordingly, the system 200 can locate the package 206 within the three-dimensional space encompassed by the reference frame 204. In at least one additional embodiment, the package position can refer the location of the package 206 within the reference frame 204 independent of where the package 206 is within the environment of the robot. In at least one further embodiment, the package orientation can refer to a directionality of the package 206 within the reference frame 204. In particular, the package orientation indicates one or more surfaces of the package 206 that are observable by the sensor 202. Additionally, the package orientation can be determined relative to the indicator 210, a neutral position of the final joint 208, and/or a first image that includes the package 206. Further, the package orientation can indicate that the one or more surfaces observed by the sensor 202 change over time. For example, if the package 206 is a cuboid, the sensor 202 can observe a top surface, a front surface, and a right surface of the package 206 in a first package orientation. Additionally, the package 206 can be rotated such that the sensor 202 can observe the top surface, a rear surface, and a left surface of the package 206 in a second package orientation. Further, the first package orientation and the second package orientation can indicate that the package 206 is being rotated around a vertical axis (i.e., the top surface is constantly observed by the sensor 202) and a rotation direction (i.e., clockwise or counterclockwise). It should be noted that while the package orientation is explained relative to a cuboid, the system 200 can determine the package orientation for any package 206 including boxes, pouches, and envelopes regardless of a number of surfaces or shape of the surfaces. In general, the indicator 210 can allow the system to determine the package position and/or the package orientation for each captured image. Additionally, the indicator 210 can allow the system to determine what part of the image is the package 206.

In some embodiments, the system 200 can determine one or more package dimensions (i.e., height, width, length, radius, circumference, etc.) for the package 206. In particular, the system 200 can capture and receive a plurality of images via at least the sensor 202. Additionally, each of the plurality of images can be associated with a package position and a package orientation of the package 206 within the reference frame 204. Further, the system 200 can determine the one or more package dimensions based on the plurality of images. In at least one embodiment, the system 200 can determine the one or more package dimensions based on a reference such as the indicator 210 (i.e., the known width/height of the indicator 210), an identifier associated with the package 206 (i.e., a label on the package 206 of known width/height), and/or the physical dimensions associated with the final joint 208. Accordingly, the system 200 can determine the one or more package dimensions by referencing known values of object size within the one or more images. In at least one additional embodiment, the system 200 can determine the one or more package dimensions by generating a model of the package 206. Additionally, the model can be generated based on variations in package position and package orientation between adjacent images within the plurality of images (i.e., a first image and a third image are adjacent images for a second image). Further, the variations in package position and package orientation can enable the system 200 to combine the plurality of images into a single three-dimensional model of the package 206. From the model generated by the system 200, the one or more package dimensions can be determined for the package 206.

In at least one further embodiment, the package identity and the package dimensions can be determined to track the package 206 throughout a distribution facility that includes the robot, the first location 212, the second location 214, and additional distribution systems (i.e., packaging systems, package tracking systems, collection systems, loading systems, unloading systems, etc.). Due to a large number of packages that are handled by the distribution facility, one or more servers of a package tracking system can be configured to track individual packages between arrival, storage, and shipping and facilitate the delivery of the one or more packages to the delivery destination. The tracking of each package, by the package tracking system is necessary to ensure that the individual packages are properly delivered to a destination associated with a customer. Identification of packages during the item/product fulfillment process allows the package 206 to be tracked within the distribution facility and allows any misplacement to be corrected before the package 206 leaves the distribution facility. Additionally, the package identity can be required for a downstream system to place the package 206 correctly, assigned to a storage container that will be relocated within the distribution facility, and/or associated with a location on a conveyor belt so that the downstream system can acquire the package 206. Further, modeling the package 206 and determining dimensions of the package may alter how the package 206 is handled by the distribution facility. A generated model and dimensions for the package 206 can be provided to a database and accessed by the downstream systems associated with the package 206. For example, the generated model and dimensions of the package 206 can be utilized to assign a route for through the dimension ranges associated with the downstream systems, whether any damage is detected from the model, and how additional modifications for the package 206 will be applied. Accordingly, the generated model and dimensions can be utilized to confirm the route of the package 206 through the distribution facility and determine whether any modifications to the route are necessary. The dimensions and/or weight of the package 206, as well as different packages, may also be considered to more efficiently ship packages. For instance, the dimensions, weight, volume, etc. of packages may be used to determine the number and type of packages that will be placed in a container, bin, box, delivery vehicle, etc. used to transport and deliver the packages.

In some additional embodiments, the sensor 202 can be a dimensioning scanner or a 3D sensor (e.g., an omni-directional stereo (ODS) camera) and can be associated with one or more additional sensors. Additionally, the system 200 can receive the plurality of images from the sensor 202 and an additional plurality of images from the one or more additional sensors. Further, the sensor 202 and the one or more additional sensors can be configured to generate the plurality of images and the additional plurality of images such that a first image the plurality of images and the additional plurality of images is of the package 206 in a first package position and a first package orientation. Similarly, a shared package position and a shared package orientation can be maintained for each subsequent image of the plurality of images and the additional plurality of images. In at least one embodiment, each of the plurality of images and the additional plurality of images can comprise a point map configured to represent the package 206 within the reference frame 204. Additionally, a plurality of point maps can be combined by the system 200 to generate a three-dimensional mesh representative of the package 206. Further, the system 200 can generate the model by combining the plurality of point maps based on an order or a sequence of the plurality of point maps. Similarly, the system 200 can combine the plurality of point maps based on the package position and the package orientation within the reference frame 204 associated with each of the plurality of point maps. For example, each of the plurality of point maps is associated with the package position and the package orientation of the package 206 at a point in time or a point in a movement cycle. Based on differences in package position and package orientation between individual point maps, the system 200 can determine a relationship between the individual point maps in a three-dimensional model. Accordingly, package position and package orientation variations can be utilized by the system 200 to combine the plurality of point maps into a three-dimensional model of the package 206. Similarly, the plurality of images and the additional plurality of images can be combined based on the package position and package orientation shared by individual images. In at least one additional embodiment, the variations in package position and package orientation can be determined based on the one or more joints of the robot. In particular, the system 200 can utilize the indicator 210 and a known distance between the indicator 210 and the package 206 to determine the product position within the reference frame 204. Additionally, the system 200 can determine the product orientation based on a rotation of the final joint 208, indicated by at least one of the one or more operating variables associated with the final joint 208 or the indicator 210. For example, the indicator 210 can comprise variations that enable the system 200 to determine the rotation of the final joint 208.

In some further embodiments, the package position and the package orientation can be determined relative to a reference point. In particular, one or more points on the package 206 can be defined as having a position within a three-dimensional space relative to the reference point and/or the reference frame 204. Additionally, the one or more points can be associated with individual surfaces, edges, and corners of the package 206. Further, the one or more points can be combined to create a point map that depicts the one or more points associated with the surface of the package depicted by an image. Accordingly, the package position can be configured to reflect motion of the one or more points (i.e., how the package 206 moves as a whole) and the package orientation can be configured to reflect motion of individual points of the one or more points (i.e., how points on the package 206 move relative to one another). In at least one embodiment, the reference frame 204 can be a fixed volume of space associated with a fixed distance and a fixed location relative to the sensor 202 and the individual joint of the robot where the one or more sensors are attached. Additionally, the one or more points can be defined as coordinates within the coordinate system of the reference frame 204 and the individual joint of the robot. Accordingly, the package position and the package orientation can be defined relative to the reference frame 204. In at least one additional embodiment, and as noted above, the indicator 210 can be utilized by the system 200 as the reference point for the package position and the package orientation. Accordingly, each of the one or more points associated with the package 206 can be associated with a position relative to the indicator 210.

In at least one embodiment, the three-dimensional model of the package 206 can be generated based at least in part on a position variation and an orientation variation between individual images of a set of images. In particular, the individual images can be point meshes. For example, the system 200 can identify a first image of the set of images that depicts a first package position and a first package orientation of the package 206 and a second image of the set of images that depicts a second package position and a second package orientation of the package 206. Additionally, the system 200 can determine, based at least in part on the first image and the second image, the position variation and the orientation variation between the first image and the second image. The position variation can indicate one or more first differences between the first package position and the second package position. For instance, the first image may depict the package 206 at the first package position and in closer proximity to the first location. Similarly, the second image may depict the package 206 at the second package position and in closer proximity to the second location as the package is being transported to the second location. Further, the orientation variation can indicate one or more second differences between the first package orientation and the second package orientation. For example, the first image may depict a top or bottom surface and one or more sides of the package 206 and the second image may depict the top or bottom surface and one or more different sides of the package 206 as the package is being rotated during transport from the first location to the second location. Each of the one or more first differences and/or the one or more second differences can be determined based on one or more points that associated with the package 206 in the first image and the second image. Accordingly, the system 200 can generate the three-dimensional model of the package 206 by combining at least the first image and the second image based on the positional variation and the orientation variation between the first image and the second image. Further, the images can be combined to generate the three-dimensional model from the variation between the one or more points associated with the first image and the corresponding point, for each of the one or more points, in the second image.

In at least one additional embodiment, the system 200 can receive, from a database, package surface information that includes expected package dimensions, an expected package shape, and/or an expected topology for the surfaces of the package. In particular, the expected topology can include expected holes, curves, cutouts, texture variations, and other surface variations that the package 206 includes. Accordingly, and based at least in part on the three-dimensional model, the system 200 can determine that the package 206 has different package dimensions, a different package shape, and/or a different package topology than what is described by the package surface information. Further, the system 200 can determine that the package 206 is damaged based on the differences between the three-dimensional model and the package surface information. For example, the system 200 can identified punctures, crumpled surfaces, compressed packages, torn packaging material, and other damages to the package 206 and cause the package 206 to be transferred to a quality assurance system. Additionally, the quality assurance system can be configured to replace the package 206 with an undamaged package in the distribution facility.

In some embodiments, the system 200 can determine an identity of the package 206 based on the one or more images received from the sensor 202. In particular, the system 200 can identify the package 206 based on the one or more images of the package 206 being rotated or manipulated within the reference frame 204. In at least one embodiment, and as noted above with respect to FIG. 1, the system 200 can identify an identifier located on the package 206 within the reference frame 204. In some additional embodiments, the system 200 can identify the package 206 based on the one or more package dimensions. In particular, the system 200 can receive an indication or a list of one or more packages that are associated with the first location 212. This indication or list may include the specific packages placed and currently located in a bin or container, or an order of packages being transported via a conveyor belt. The list/indication may also include the dimensions, volume, and/or weight of each of the packages. For example, the first location 212 can be a storage container associated with the one or more packages. As the robot removes the package 206 from the storage container, the system 200 can attempt to locate the identifier for the package 206, which may be printed on or adhered to an exterior surface of the package 206. If the identifier is located, the system 200 can update the list associated with the storage container to indicate that the package 206 was successfully removed and identified.

However, where the identifier is not located, the system 200 can determine the one or more package dimensions for the package 206. Additionally, the system 200 can reference the one or more package dimensions against the list associated with the storage container. If the system 200 determines that the one or more package dimensions are unique to the package 206, the system 200 can identify and deposit the package 206 at the second location 214. Alternatively, if the system 200 determines that the one or more package dimensions are not unique, the system 200 can further determine a package weight for the package 206. Similarly, the system 200 can determine whether the package weight or the combination of the package weight and the one or more package dimensions are unique to identify the package 206. However, if the package 206 cannot be identified based on the one or more package dimensions and/or the package weight, the system 200 can flag the package 206 for intervention or investigation (i.e., indicate that the package 206 requires additional identification). In at least one additional embodiment, the system 200 can deposit a flagged package at the second location 214 and cause a downstream system (e.g., a different robot, a person, etc.) to identify the package 206. Additionally, the system 200 can receive one or more supplemental images from a supplemental sensor. As noted above, the final joint 208 can occlude or block the identifier of the package 206. Accordingly, the system 200 can identify the package 206 based on the one or more supplemental images received from the supplemental sensor. Accordingly, the supplemental sensor can be mounted over the second location 214 to image the top surface of the package 206, to the final joint 208 of the robot and configured to image the top surface of the package 206 after placement at the second location 214, and/or in an alternative location where occluded portions of the package 206 can be imaged. Further, if the system 200 is unable to identify the package 206 based on the one or more supplemental images, the package 206 can remain flagged for downstream identification. In at least one further embodiment, the system 200 can deposit the flagged package at a third location for identification.

In some embodiments, the first location 212 and the second location 214 can be configured as a package source (i.e., 212) and a package destination (i.e., 214). In particular, and as mentioned above, the first location 212 can be a static package source (e.g., a storage container) or a dynamic package source (e.g., a conveyor belt, an output of an upstream system, etc.). Similarly, the second location 214 can be a static package destination or a dynamic package destination (e.g., a conveyor belt, an input of a downstream system, etc.). Additionally, the first location 212 and the second location 214 can include plurality of product sources and a plurality of product destinations. Further, the list associated with the one or more packages can indicate the package destination where the package 206 is to be deposited, that the package 206 has been deposited at the second location 214, and that the package 206 has been removed from the first location 212.

Figure 3:
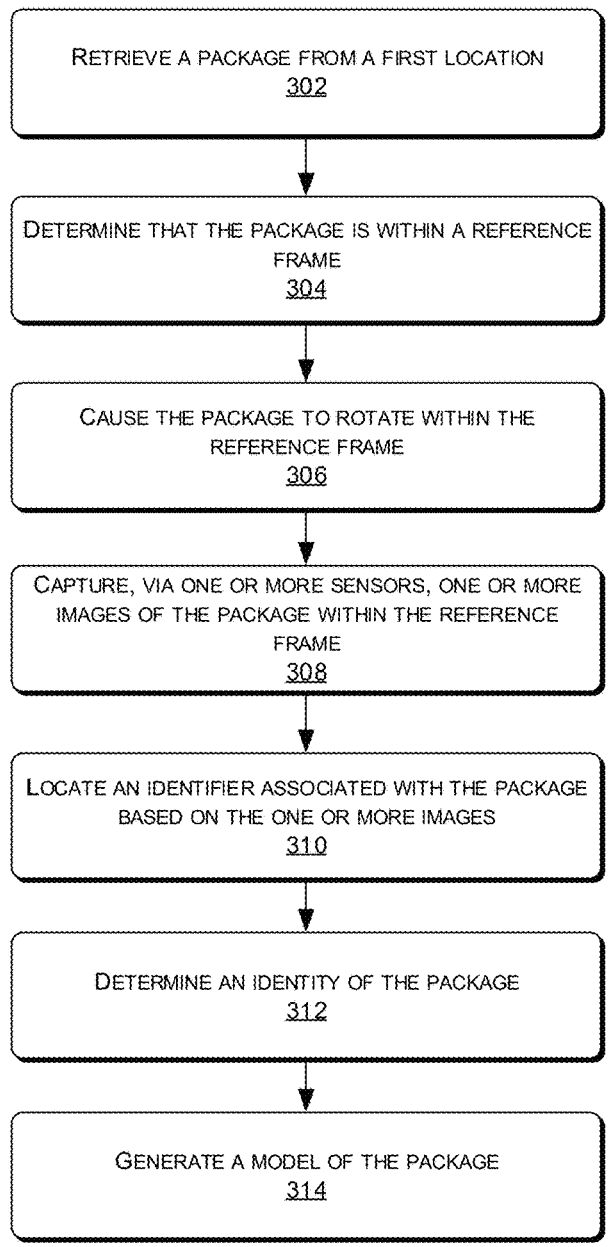
FIG. 3 illustrates an example process for determining a package identity based on captured images of a package that is moved between a first location corresponding to a package source and a second location corresponding to a package destination.

FIG. 3 illustrates an example process for determining a package identity based on captured images of a package that is moved between a first location that is a package source and a second location that is a package destination.

At block 302, a process 300 can include causing a package to be removed from a first location by a robot associated with the process 300. In some embodiments, the robot can be configured to identify a surface of the package and attach to the surface of the package (e.g., via pneumatics, applied suction, adhesive, etc.). Additionally, the robot can remove the package from the first location, wherein the first location can be a package source that contains a fixed number of packages (e.g., a storage container) or a dynamic number of packages (e.g., a chute output, a receiving location associated with the output of an upstream system, etc.). In some additional embodiments, a system associated with the robot can receive an indication that the robot has attached to the package. Alternatively, the system can be configured to determine that the package has been removed from the package source by the robot. In at least one embodiment, the robot can be associated with a robot control system in communication with the system, wherein the system is a package modeling and identification system associated with the one or more sensors, the robot, and/or a database that stores package information.

At block 304, the process 300 can include determining that the package is within a reference frame associated with the robot. In some embodiments, and as described above, the reference frame can be configured as a volume of space that occupies a fixed position in a coordinate system. In at least one embodiment, the coordinate system is associated with an individual joint of the robot. Additionally, when the individual joint moves, it can cause the entire coordinate system to move proportionally. For example, the reference frame can be configured to occupy a cuboid having dimensions of 17 inches tall, by 13 inches wide, by 12 inches deep, wherein a center of the cuboid can be located 32 inches in front of a neutral position associated with the first joint and 6 inches above a central point of a first arm of the robot that connects the first joint to a second joint. Accordingly, when the first joint rotates 90-degrees, the center of the cuboid continues to be located 32 inches in from of the neutral point and 6 inches above the central point of the first arm. In at least one additional embodiment, the reference frame can be associated with a final joint of the robot. Additionally, the final joint can comprise an indicator that can be utilized as a reference point for determining a rotational position of the final joint (i.e., an amount of positive or negative rotation from the neutral point associated with the final joint) and a position within the reference frame relative to the indicator (i.e., coordinates for the position and a distance from the indicator to the coordinates). In some additional embodiments, the reference frame can be configured as the volume of space where one or more fields of view associated with one or more sensors overlap. In general, the one or more sensors can be configured to observe the reference frame while active. In at least one further embodiment, the sensors can be activated by the system when the package is within the reference frame and deactivated when the reference frame does not include the package.

In some further embodiments, at block 304, the process 300 can include determining that the package is within the reference frame based on the position of one or more joints and physical dimensions of one or more arms connecting the joints of the robot. In particular, a first joint of the robot can be connected to a support for the robot (e.g., a floor, a wall, a ceiling, a support frame, etc.) and a first arm of the robot. Additionally, the first arm of the robot connects a second joint to the first joint. Accordingly, the one or more joints and the one or more arms can be utilized by the system to calculate the position of the package attached to the final joint. Further, the reference frame occupies a known volume of space at a known location. Based on the position of the package as the robot moves from the first location to the second location, the system can determine when the reference frame includes the position of the package.

At block 306, the process 300 can include causing the package to rotate within the reference frame. In some embodiments, the system can cause the package to rotate within the reference frame in response to the determination that the package is within the reference frame. Additionally, the robot can be configured to rotate the package along a path between a first location and a second location. Further, and as noted above, the path can be configured as an optimized path determined to minimize cycle time between removing the package from the first location, depositing the package at the second location, and returning to the first location. In some additional embodiments, the one or more sensors can be attached to the individual joint of the robot and the reference frame configured such that the sensors only observe the rotation of the package within the reference frame. Additionally, the sensors can capture motion of the environment where the robot is located. Accordingly, the reference frame and the fields of view associated with the one or more sensors can be configured to track the package between the first location and the second location.

At block 308, the process 300 can include capturing one or more images of the package within the reference frame and the fields of view of the one or more sensors. In some embodiments, the one or more sensors can constantly capture and transmit images to the system of the reference frame. Accordingly, the system can utilize the images to determine whether the package is within the reference frame. In some additional embodiments, the system can cause the one or more sensors to capture and transmit images to the system of the reference when the package is located within the reference frame. Accordingly, the system can also capture one or more images in a sequence or an order of the package rotating within the reference frame. Additionally, the rotation of the package within the reference frame allows the one or more sensors to capture at least one image for each surface of the package.

At block 310, the process 300 can include locating an identifier associated with the package based on the one or more images. In particular, the packages can comprise one or more identifiers on one or more surfaces of the package. Accordingly, the system can analyze the one or more images and locate the identifier for the package.

At block 312, the process 300 can include determining an identity of the package. In some embodiments, the system can determine the identity of the package based at least in part on the identifier located on the package. In particular, the identifier can include a barcode and/or a label that includes information regarding the package and/or the item within the package. Additionally, determining the identity of the package enables the system and a distribution system associated with the system to monitor the package throughout one or more downstream systems. Further, determining the identity of the package can enable the system or the distribution system to assign an endpoint, a distribution workflow, and/or additional handling to the package. For example, the package can be identified by the system and associated with a delivery destination that is within a delivery range of the distribution system. Additionally, the system can determine that a customer associated with the package selected overnight shipping. Accordingly, based on identifying the package, the package can be assigned to the downstream systems for expedited processing of the package and the endpoint for expedited delivery to the delivery destination. Further, identifying that the package is associated with overnight delivery can cause the robot to place the package at an alternative location that directly feeds an expedited processing line. Accordingly, identification of the package by the system allows the distribution system to autonomously determine how the package should be handled by systems downstream of the robot.

At block 314, the process 300 can include generating a model of the package. In some embodiments, and as noted above, the one or more sensors can capture a plurality of images of the package and combine the pictures to generate a three-dimensional model of the package (e.g., a three-dimensional mesh model, a three-dimensional image of the package, etc.). In particular, the system can cause the one or more sensors to capture the one or more images at fixed intervals. The fixed intervals can be a period of time (e.g., milliseconds, seconds, etc.) or an amount of rotation by the final joint (e.g., 5-degrees of rotation, 10-degrees of rotation, 20-degrees of rotation, etc.). Additionally, the system can determine a package position within the reference frame. The system can be further configured to compare the package position for each of the one or more images and account for any extraneous motion caused by one or more joints between the final joint and the individual joint where the one or more sensors are attached to the robot. Further, the system can determine a package orientation that identifies the amount of rotation that has occurred between individual images of the one or more images. Accordingly, the system can combine the one or more images to generate the model of the package based on the relationship between the package position and the package orientation of the individual images. In at least one embodiment, generating the model increases the efficiency of downstream systems. For example, packing systems and loading systems can utilize models for a plurality of packages to determine the optimal packing within a storage container or a delivery vehicle. Additionally, the models can be utilized by downstream packaging systems and package modification systems for determining an amount of material required by the package. In at least one additional embodiment, the model increases the efficiency of the distribution process by providing dimension information for identifying the package, tracking the package through the distribution system (i.e., determine that models or dimensions generated by various systems are within a tolerance of the model), and determining which downstream systems are able to receive the package (e.g., some downstream systems cannot accept packages larger than 10 inches×10 inches×10 inches).

Figure 4:
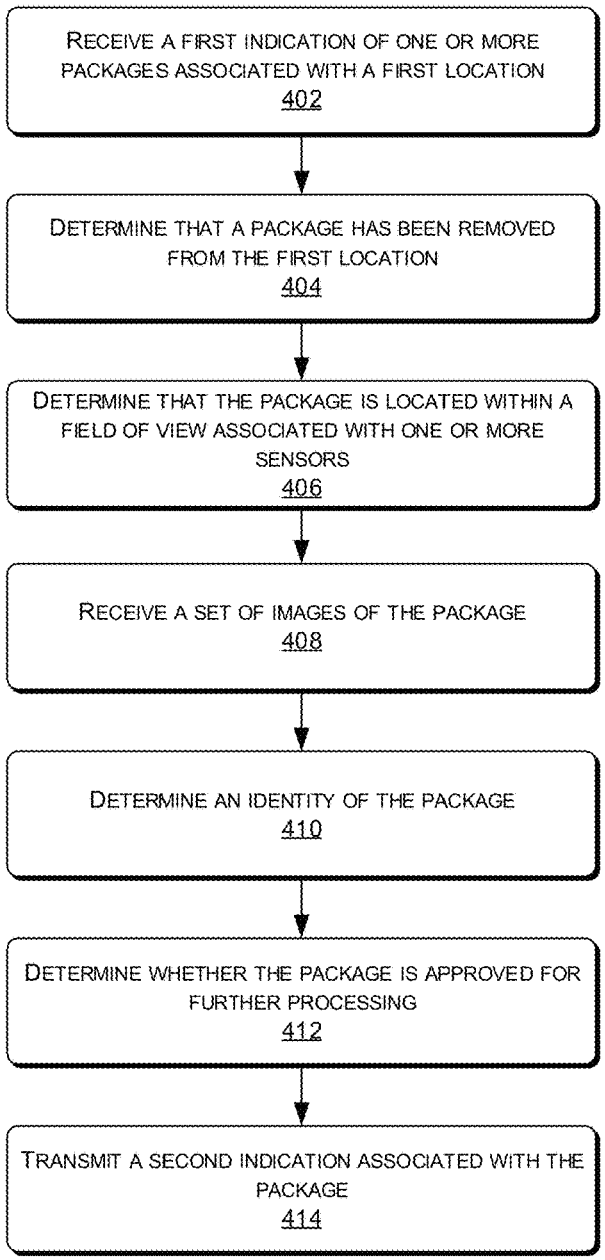
FIG. 4 illustrates an example process for receiving information relevant to the identity of a package and distributing additional and updated information regarding the package to other systems.

FIG. 4 illustrates an example process for receiving information relevant to the identity of a package and distributing additional and updated information regarding the package to other systems.

At block 402, the process 400 can include receiving, by a system or a control system, a first indication related to one or more packages associated with a first location. In some embodiments, the first indication can include a list of one or more packages that are associated with a first location. In at least one embodiment, the first indication can include the one or more packages within a static inventory associated with the first location. In at least one additional embodiment, the first indication can include the one or more packages that have been associated with a dynamic inventory. In particular, the dynamic inventory can comprise a dynamic list that is updated to include a delivered package based on the system received an additional indication. In some additional embodiments, the first indication can include package information associated with the one or more packages. Additionally, the package information can include a weight, one or more dimensions, an identifier, and an endpoint associated with each of the one or more packages.

At block 404, the process 400 can include determining that a package has been removed from the first location. In some embodiments, the system can cause the robot to remove the package from the first location in a manner discussed with respect to block 302. In some additional embodiments, the system can monitor a weight associated with the one or more packages and the first location. Additionally, the system can determine that the package has been removed from the first location based on a change in the weight. For example, the first location can be comprised of a scale that transmits the weight to the system. Further, once the package is removed from the first location, the system can determine a package weight associated with the package, the package weight being the difference between a first weight, received prior to detecting that the package was removed, and a second weight, received after detecting that the package was removed. In some further embodiments, the system can determine that the package has been removed from the first location based on one or more operating values associated with the robot. In particular, the system can access one or more reference values that indicate a reference force, a reference torque, a reference velocity, and/or a reference acceleration. Additionally, the one or more reference values can be associated with the robot completing a cycle without an attached package. Further, the system can determine the package weight and that the package has been removed for the first location based on a difference between the one or more operating values and the one or more reference values. In at least one embodiment, the system can determine that the final joint has failed to attach to a package and reset the cycle of the robot. In particular, the system can determine that the one or more operating values are approximately equal to the one or more reference values and/or that the weight associated with the first location has not changed. Additionally, the system can determine that the robot has started to move from the first location to the second location without the package. Accordingly, the system can reset the cycle and cause the robot to return to the first location and remove the package from the first location. In at least one additional embodiment, the system can be configured to differentiate between an increase in the weight caused by a new package being added to the first location and a decrease in the weight caused by the package being removed from the first location.

At block 406, the process 400 can include determining that the package is located within a field of view associated with one or more sensors. In general, the system can determine that the package is located with the field of view in a manner discussed above with respect to FIG. 1, FIG. 2, block 304, and block 306.

At block 408, the process 400 can include receiving, by the system, a set of images of the package, wherein the set of images can include one or more images. In general, the system can receive the set of images in a manner discussed with respect to FIG. 1, FIG. 2, and block 308. The images may depict the package as it is being rotated and transported by the robot. Since the package is being rotated during transport from the first location to the second location, each image may depict a different perspective of the package.

At block 410, the process 400 can include determining an identity of the package. In some embodiments, the system can determine the identity of the package in a manner discussed above with respect to block 312. In some additional embodiments, the system can determine the identity of the package based on dimension information associated with the package. In particular, the dimension information can be determined based on the set of images received by the system. As noted above, the dimension information can be determined based on the system generating a three-dimensional model of the package. Alternatively, the system can be configured to determine the dimension information based on a reference measurement associated with the final joint and/or the reference frame. Additionally, the system can identify the package based on a determination that the dimension information is unique to a single package of the one or more packages associated with the first location, wherein the system determines that the single package is the package removed from the first location based on the dimension information. In some further embodiments, the system can determine the identity of the package based on the package weight. As discussed above, the system can determine the package weight. Additionally, the system can identify the package based on a determination that the package weight is unique to the single package of the one or more packages associated with the first location, wherein the system determines that the single package is the package removed from the location based on the package weight. In at least one embodiment, the system can identify the package based on a determination that a combination of the dimension information and the package weight is unique to the single package of the one or more packages, wherein the system determines that the single package is the package removed from the first location based on the package weight and the dimension information.

At block 412, the process 400 can include determining whether the package is approved for further processing. In some embodiments, the package is approved for further processing consistent with the first indication received by the system. In particular, the system can verify that the package was identified, that the package was properly associated with the first location, and that the package was imaged by the system. Accordingly, the system can approve the package to be routed to a downstream system (e.g., package modification systems, delivery vehicle loading systems, sorting systems, quality assurance systems, etc.) and ultimately to an endpoint (i.e., a final destination for the package within a distribution facility associated with a delivery destination and shipping information of the package) associated with the package. In some additional embodiments, the system can determine that the package is not approved for further processing consistent with the first indication received by the system. In particular, the system can determine that the package has not been identified and direct the package to receive additional handling to for further identification. Additionally, the system can determine that the package was not associated with the first location. For example, the system can determine that the package should not have been within the first location and was erroneously placed in the first location. Accordingly, the system can indicate that the package should be rerouted and/or directed to receive additional handling to be properly placed within the distribution system. Further the system can determine that the package is damaged or flawed based on the set of images received from the one or more sensors. For example, the system can detect a tear or hole in the package, a crumpled surface of the package, a compressed package, and other packages that have sustained damage based on the set of images and/or a three-dimensional model of the package. In an additional example, the system can determine that an identifier or a label is missing, that a shipping label conflicts with the package information of the package, and/or that the package flawed and redirect the package to receive additional handling to at a quality assurance station and maintain package quality within the distribution system. In a further example, the system can detect a spill, a tear, a rupture, and/or other surface damage associated with the package. In general, the system can utilize image analysis, neural network analysis, or other data analysis techniques to detect damage, flaws, and/or other issues associated with the package.

At block 414, the process 400 can include transmitting, by the system, a second indication associated with the package. In particular, the system can transmit the package information, the set of images, and/or the first indication associated with the package to one or more systems within the distribution system. Additionally, the system can transmit the second indication to a database that stores and associates the package information, the set of images, and the first indication with the package. For example, the data can create or update a package profile that includes at least the second indication.

Figure 5:
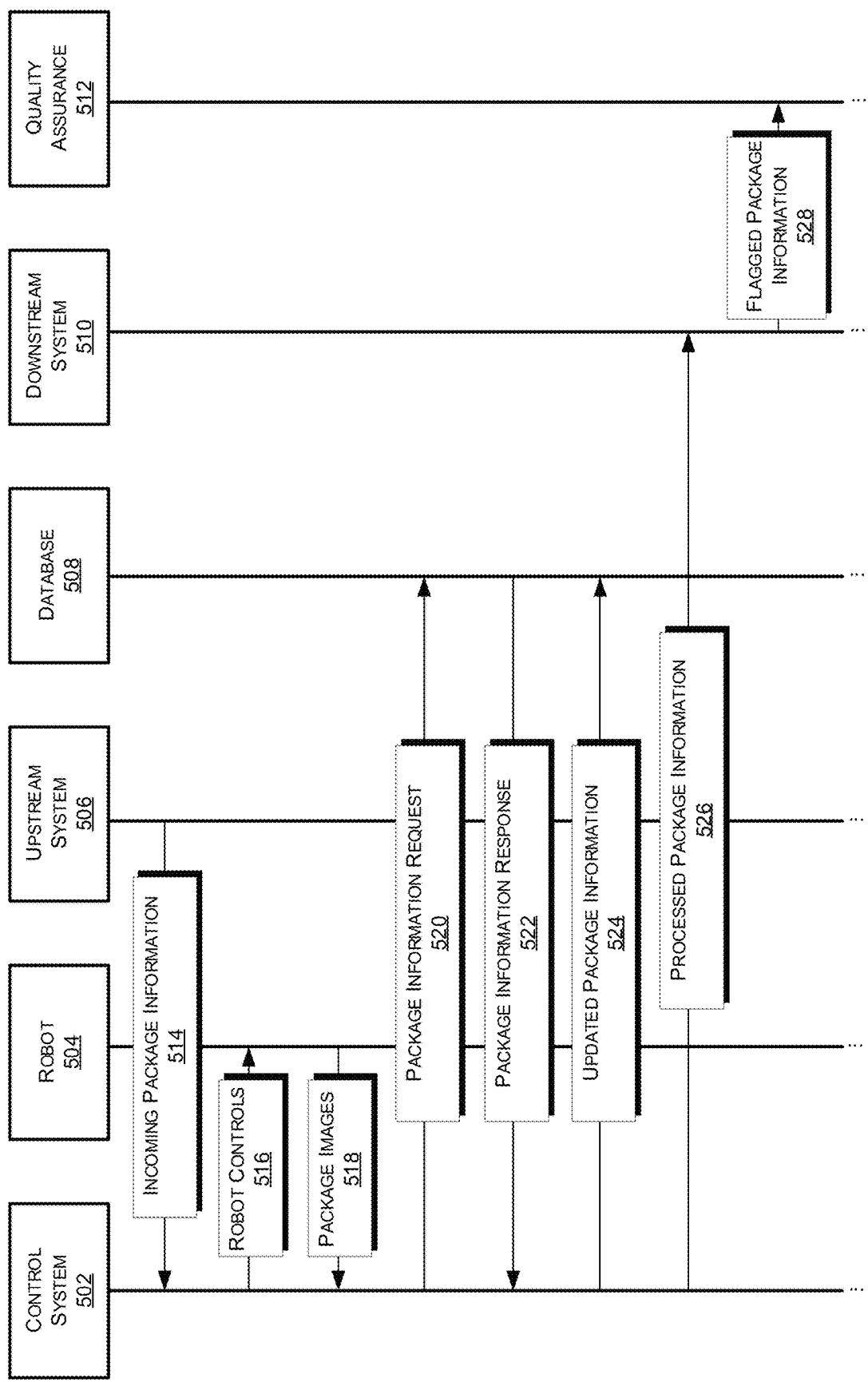
FIG. 5 illustrates a flow diagram that describes the exchange of information and commands between a control system and various systems related to distributing one or more packages.

FIG. 5 illustrates a flow diagram that describes the exchange of information and commands between a control system and various systems related to distributing one or more packages. In particular, a control system 502 can be configured to exchange information with a robot 504, an upstream system 506, a database 508, a downstream system 510, and a quality assurance system 512 within a distribution system.

In some embodiments, the robot 504 can comprise a plurality of degrees of freedom. In particular, a degree of freedom can be a rotational axis or a linear axis that is associated with a joint of the robot 504. In at least one embodiment, a final joint can be configured to rotate at a final joint rate that is greater than a first join configured to rotate at a first joint rate. For example, the final joint can complete one or more rotations (e.g., either full or partial rotations) around a final axis during a quarter rotation of the first joint around a first axis. In at least one additional embodiment, the first joint can secure the final joint and one or more connecting joints to a robot support. The robot support can be a static support that connects the robot 504 to a floor, a wall, a ceiling, and/or a support frame. Alternatively, the robot support can be mobile and enable movement along a rail or a track between a first location and a second location.

In some embodiments, the control system 502 can receive incoming package information 514 from the upstream system 506. As noted above, the incoming package information 514 can indicate one or more packages that are associated with a first location. Additionally, the incoming package information 514 can include an endpoint, a weight, a dimension, an identifier, and other information associated with each of the one or more packages. In at least one embodiment, the incoming package information 514 can include a first package information associated with one or more first packages that is received at a first time and a second package information associated with one or more second packages that is received at a second time.

In some embodiments, the control system 502 can determine one or more robot controls 516 and transmit the robot controls 516 to the robot 504. In particular, the robot controls 516 can be configured to cause the robot 504 to remove a package from the first location and deposit the package at the second location. Additionally, the robot controls 516 can be configured to cause one or more sensors attached to the robot 504 to track the package between the first location and the second location. Further, the robot controls 516 can be configured to cause the robot 504 to rotate, via at least a final joint, the package with a field of view associated with the one or more sensors.

At block 518, the control system 502 can receive package images 518 captured by one or more sensors attached to the robot 504. In some embodiments, the one or more images can be captured by the one or more sensors based on the robot controls 516.

At blocks 520 and 522, the control system 502 can transmit a package information request 520 to the database 508 and receive a package information response 522 from the database 508. In some embodiments, the database 508 can store routing information, dimension information, a package weight, and identifier information associated with each of the one or more packages. Additionally, the control system 502 can determine that additional information is required to identify the package attached to the final joint of the robot 504 and captured within the one or more images. Accordingly, the database 508 can transmit the package information response 522 comprising information requested by the package information request 520. Further, the control system 502 can determine an identity of the package based on the package information response 522. In some additional embodiments, the second location includes a plurality of deposit locations. Additionally, the control system 502 can transmit the package information request 520 to determine a deposit location, associated with the second location, for the package. Accordingly, the control system 502 can determine the deposit location based on routing information associated with the package that is received from the database 508. In at least one embodiment, the package information request 520 can include an identifier associated with the package. Accordingly, the database 508 can determine an identity associated with the package and transmit the identity to the control system 502.

At block 524, the control system 502 can transmit updated package information 524 to the database 508. In some embodiments, the updated package information 524 can comprise the identity of the package, an identifier associated with the package, dimension information, a three-dimensional package model, a package weight, and one or more images associated with the package. Additionally, the database 508 can create a package profile or replace old package information with the updated package information 524. For example, the control system 502 can determine the identity of the package, a package weight, and dimension information for the package. However, the control system 502 can determine that the package profile associated with the database 508 includes incorrect or out of date information. Accordingly, the control system 502 can cause the database 508 to update the package profile to include the package weight and the dimension information based on the identity of the package matching the identity associated with the package profile.

At block 526, the control system 502 can transmit processed package information 526 to the downstream system 510. In some embodiments, the processed package information 526 can comprise the package weight, the dimension information, the three-dimensional model, and the identity of the package. In at least one embodiment, the downstream system 510 can require processed package information 526, such as the three-dimensional model, to configure the downstream system 510 for the package. In some additional embodiments, the processed package information 526 can comprise update package routing information that alters how the package is handled by the downstream system(s) 510. In at least one embodiment, the control system 502 can flag the package and cause the package to be routed by the downstream system(s) 510 to the quality assurance system 512. Additionally, the downstream system(s) 510 can forward flagged package information 528 to the quality assurance system 512, wherein the flagged package information can comprise an indication of package damage, a missing package identifier, an incorrect label, and other flaws detected by the control system 502.

Figure 6:
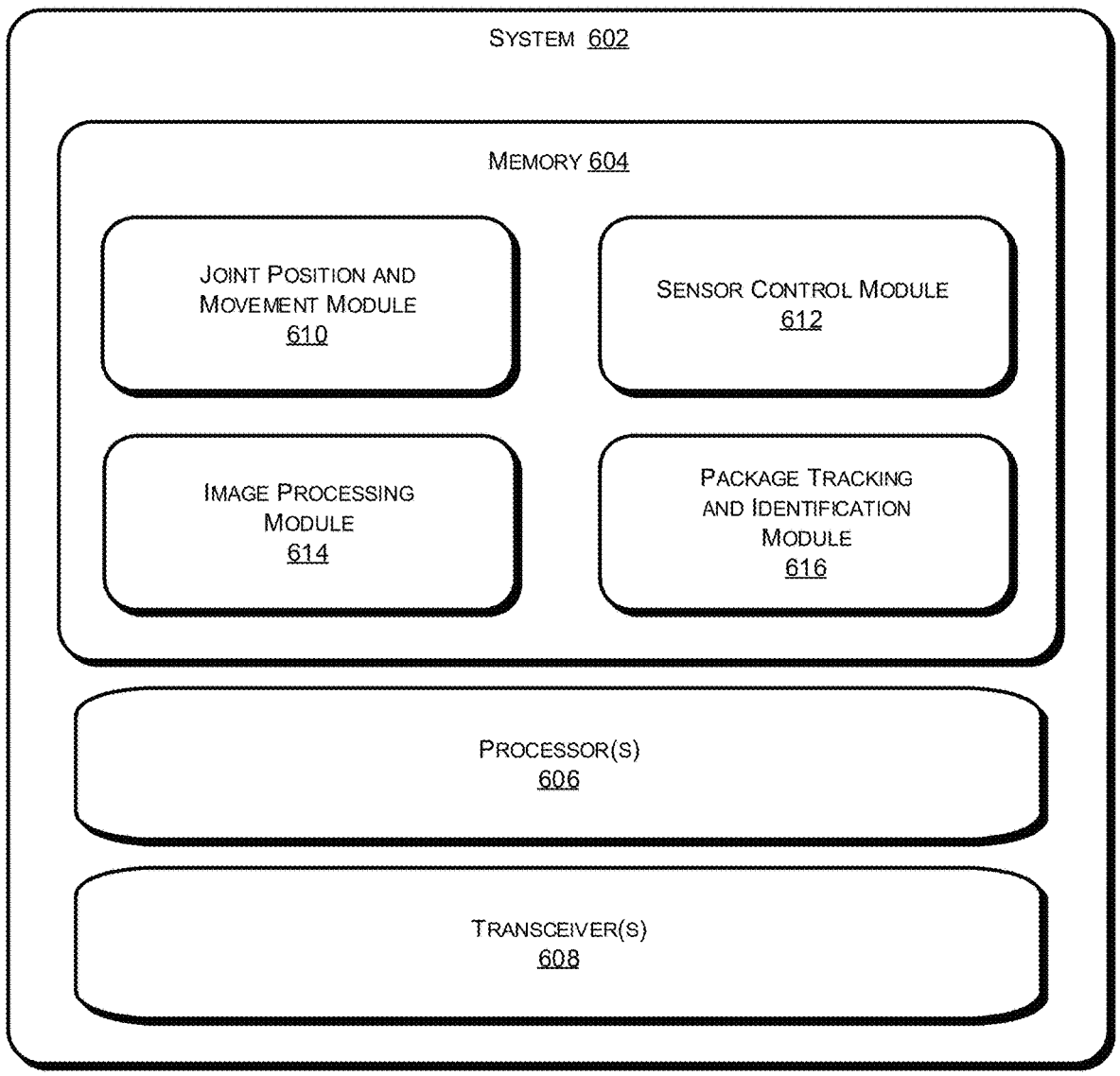
FIG. 6 illustrates a block diagram of a control system that is configured to monitor a robot, capture images of a package, generate three-dimension models and identifying information, determine an identity of the package, and distribute information regarding the package.

FIG. 6 illustrates a block diagram of a control system that is configured to monitor a robot that transports and rotates a package from a first location to a second location, capture images of the package during transport/rotation, generate three-dimension models and identifying information, determine an identity of the package, and distribute information regarding the package. In some embodiments, control system 602 can correspond to any of the systems discussed in FIGS. 1-5. As illustrated, control system 602 is generally comprised of memory 604, one or more processors 606, and one or more transceivers 608.

In some embodiments, memory 604 can be volatile (such as RAM), non-volatile (such as ROM, flash memory, etc.) or some combination of the two. The memory 604 may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store the desired information in a format that the control system 602 accesses during execution of the above methods and/or operation of the above systems. The memory 604 can comprise one or more modules that cause the processors to execute one or more instructions and perform the operations discussed above. Further, the memory 604 can comprise additional modules that can be executed by the processors 606 and cause the processors 606 to perform additional operations associated with the control system 602. The additional modules can comprise network forwarding modules, network monitoring modules, package handling modules, and information distribution modules.

In some embodiments, the processors 606 can include one or more central processing units (CPUs), one or more graphics processing units (GPUs), both CPUs and GPUs, or other processing units or components known in the art.

In some embodiments, the transceivers 608 can include one or more wired or wireless transceivers. For instance, the transceivers 608 can include a network interface card, a network adapter, a LAN adapter, an address associated with a network connection, or another device permitting communications to be sent and received. Additionally, the transceivers 608 can comprise any wireless transceiver capable of engaging in wireless, radio frequency (RF) communication. Further, the transceivers 608 can also include other wireless modems, such as Wi-Fi, WiMax, Bluetooth, and/or infrared communication modems. Accordingly, the one or more transceivers 608 can be configured to transmit and receive controls and indications with the robot, one or more upstream systems, one or more downstream systems, a database, and/or a quality assurance system. Additionally, the one or more transceivers 608 can be configured to transmit a package identity to a package tracking system to provide an updated location of the package within the distribution facility.

In some embodiments, the memory 604 includes a joint position and movement module 610. The joint position and movement module 610 can cause the processors 606 to transmit joint controls to the robot and/or determine a position and a movement for each joint of the robot based on one or more operating values (i.e., force, torque, velocity, acceleration, etc.). For instance, the joint position and movement module 610 can determine a position for each of the one or more joints of the robot configured to place the package and the final joint within the reference frame observed by the one or more sensors. Additionally, the joint position and movement module 610 can monitor the position and movement of individual joints and arms of the robot relative to one or more other joints and one or more other arms of the robot during a cycle that moves the package from the first location to the second location. Accordingly, the joint position and movement module 610 can receive the one or more operating values of the robot and determine the position and the movement of the one or more joints and the one or more arms based on the one or more operating values. Further, the joint position and movement module 610 can cause the final joint to rotate the package with the reference frame.

In some embodiments, the memory 604 includes a sensor control module 612. The sensor control module 612 can cause the processors 606 to transmit a signal to the sensors associated with the control system 602. For instance, the sensor control module 612 can cause the one or more sensors to capture the one or more images. Additionally, the sensor control module 612 can cause the one or more sensors to continuously capture images of the reference frame. Alternatively, the sensor control module 612 can cause the one or more sensors to capture images of the reference frame in response to a determination that the package is located within the reference frame. The sensor control module 612 may also cause the scanners of the robot to activate/deactivate and scan the reference frame to detect one or more identifiers associated with the package and/or the robot.

In some embodiments, the memory 604 includes an image processing module 614. The image processing module 614 can cause the processors 606 to analyze the one or more images captured by the sensors and generate information regarding the package. For instance, the image processing module 614 can determine whether the package is located within the reference frame. Additionally, the image processing module 614 can be configured to recognize an identifier, such as a barcode or a label, within the one or more pictures of the package. Further, the image processing module 614 can be configured to combine the one or more images, based on a package position and a package orientation associated with each of the one or more images, to generate a three-dimensional model of the package and/or dimension information related to the package. Accordingly, the image processing module 614 can be configured to determine package information from the one or more images of the package.

In some embodiments, the memory 604 includes a package tracking and identification module 616. The package tracking and identification module 616 can cause the processors 606 to identify the package within the field of view in combination with the image processing module 614. Additionally, the package tracking and identification module 616 can receive information regarding the one or more packages associated with the package source and transmit information regarding the package that the robot deposited at a package destination. For instance, the package tracking and identification module 616 can configure and/or determine the reference frame relative to an indicator associated with the final joint or a coordinate system relative to a joint that the one or more sensors are attached to. Additionally, the package tracking and identification module 616 can coordinate with the joint position and movement module 612 to track the package and determine the location of the package between the first location and the second location. Further, the package tracking and identification module 616 can be configured to track the package position and the package position relative to the reference frame while the package is moved from the first location to the second location by the robot.

Figure 7:
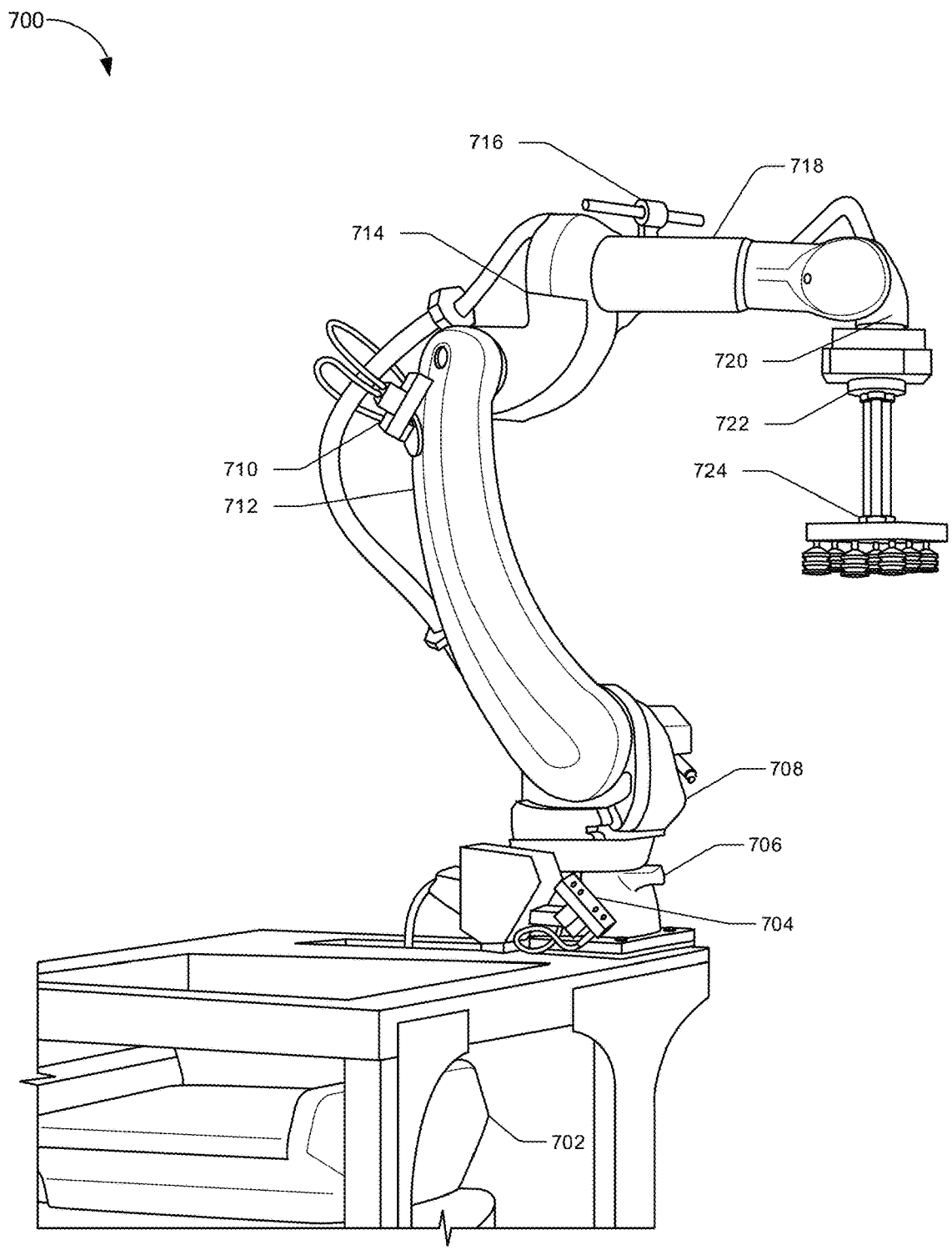
FIG. 7 illustrates an example system for imaging a package held by a robot during transit between a first location and a second location by utilizing a motion axis of the robot and one or more sensors attached to various joints or arms of the robot.

FIG. 7 illustrates an example system for imaging a package held by a robot 700 during transit between a first location 702 (i.e., a package source, such as a replaceable container, a mobile platform, a conveyor belt, etc.) and a second location (i.e., a package destination, such as a bin, an additional container, an additional conveyor belt, etc.) by utilizing a motion axis of the robot 700 and one or more sensors attached to the robot 700. In particular, FIG. 7 displays an embodiment of the robot 700 where the one or more sensors are attached to different structures associated with the robot 700. Additionally, while FIG. 7 displays an example configuration of the robot 700, the systems and methods discussed herein can be applied to any generic robot that includes at least a motion axis associated with a joint. Further, the robot 700 can be modified to include features described with respect to FIGS. 1, 2, 3, 4, 5, and/or 6. In some embodiments, a first sensor 704 can be attached to a robot support 706. Additionally, the robot 700 can include a first arm 708, a second sensor 710, a second arm 712, a third arm 714, one or more sensor supports 716, a fourth arm 718, a fifth arm 720, a sixth arm (i.e., a final arm) 722, and an attachment mechanism 724. Although the robot 700 illustrated in FIG. 7 has six arms, it is contemplated that the robot 700 can include any number of arms.

In some embodiments, the first location 702 can include one or more conveyor belts, one or more containers, or one or more package sources. In particular, the robot 700 can be configured to remove packages from the first location 702 and move the packages to the second location as a pick and place cycle. Additionally, the pick and place cycle can include variations necessary to remove the packages from a plurality of sources and deposit the packages at a plurality of destinations.

In some embodiments, the first sensor 704 can be attached to the robot support 706. In particular, the first sensor 704 can be configured such that a first reference frame includes a fixed volume of space that is observed independent of movements made by the robot 700. Additionally, the first reference frame can be defined relative to a global coordinate system associated with an environment surrounding the robot 700. Accordingly, the first sensor 704 observes a package held by the robot 700 within the fixed volume of space once the pick and place cycle of the robot 700 causes the package to be moved into the fixed volume of space. Similarly, the first sensor 704 can capture images utilized by the system to determine a package position, a package orientation, and/or a package pose relative to the environment around the robot 700. In at least on embodiment, the robot support 706 can be attached to or mounted to a mobile platform capable of moving along one or more motion axis. For example, the mobile platform can move the robot 700 along a rail, within an X-Y plane, and/or within a three-dimensional environment In some additional embodiments, the first sensor 704 can be attached to the first arm 708, the second arm 712, the third arm 714, the fourth arm, 718, the fifth arm 720, or the sixth arm 722 independent of a location of the second sensor 710. In particular, the first sensor 704 can be configured to observe the first reference frame associated with a first coordinate system that is independent from a second coordinate system associated with the second sensor 710. Similarly, the second sensor 710 can be configured to observe a second reference frame associated with the second coordinate system that is independent from the first coordinate system by mounting the second sensor 710 to any point on the robot 700. Additionally, the first reference frame and the second reference frame can overlap during the cycle of the robot 700. However, when the first sensor 704 and the second sensor 710 are attached to different arms of the robot 700, the first reference frame and the second reference frame track different movement of the robot 700 and therefore can observe different volumes of space at any given point during the cycle of the robot 700.

In at least one embodiment, the first sensor 704 can be attached to the robot support 706 and observes the fixed volume of space. Additionally, the second sensor 710 can be attached to the second arm 712 and observes a mobile volume of space during movement of the package between the first location 702 and the second location. Further, the sixth arm 722 can be configured to rotate the package held by the attachment mechanism 724 during the movement from the first location 702 and the second location. Accordingly, the first sensor 704 can be configured to capture a portion of the package rotation caused by the sixth arm 722 once the package is observable within the first reference frame associated with the first sensor 704. Similarly, the second sensor 710 can be configured to observe all of the rotation or a different part of the rotation of the package caused by the sixth arm 722 between the first location 702 and the second location.

In at least one additional embodiment, one or more first images captured by the first sensor 704 can be combined with one or more second images captured by the second sensor 710. In particular, the first sensor 704 and the second sensor 710 can capture the one or more first images and the one or more second images relative to a reference point. Additionally, the system can utilize the first images and the second images to determine the package position and the package orientation relative to the reference point despite the package and the reference point being observed from different perspectives. Further, the system can associate a first image and a second image that captured at a particular time. Accordingly, the system associated with the robot 700 can apply the methods and processes described with respect to FIGS. 1, 2, 3, 4, 5, and 6.

In some embodiments, a sensor support 716 can be associated with the first sensor 704, the second sensor 710, and/or the robot 700. In particular, the sensor support 716 can provide an attachment point for a sensor to any arm or joint of the robot 700. Additionally, each individual sensor support 716 can be associated with a mounted sensor or can be unoccupied during operation of the robot 700. Further, each sensor support 716 can be associated with one or more mounted sensors or multiple sensor supports 716 can be associated with an individual arm or joint. Accordingly, the sensor support 716 can provide multiple configurable points associated with the arms and the joints of the robot 700 such that the first sensor 704 and the second sensor 710 can observe the first reference frame or the second sensor frame defined relative to any individual arm or joint of the robot 700.

In some embodiments, the first sensor 704 and the second sensor 710 can be configured as different sensor types that gather different information. For example, the first sensor 704 can be configured as a barcode scanner that scans and determines whether a bottom surface and/or a side surface include a barcode identifier. Additionally, the second sensor 710 can be configured as a LIDAR scanner that captures the one or more second images to capture a LIDAR scan that can be utilized by the system to create a 3D model of the package. Alternatively, the first sensor 704 and the second sensor 710 can be configured to capture as the same sensor types and the same image information. It should be noted that while the LIDAR scan is utilized by the example embodiment, other image formats can be utilized to generate the 3D model including visual images and laser scans.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
monitoring, via one or more sensors associated with a robot, a reference frame that occupies a fixed location relative to a reference joint of the robot;
causing the robot to transfer a package from a first location to a second location;
determining that the package is within the reference frame;
causing, based at least in part on the package being within the reference frame, at least a rotation of the package within the reference frame;
causing the one or more sensors to capture one or more images of the package during the rotation of the package; and
determining a package identity of the package based at least in part on the one or more images by:
generating, based at least in part on the one or more images, dimension information associated with the package;
determining that the dimension information is unique to a package profile associated with the first location; and
determining, based at least in part on the package profile, the package identity for the package.

2. The method of claim 1, wherein determining the package identity further comprises:
detecting, based at least in part on the one or more images, a package identifier on one or more exterior surfaces of the package;
accessing the package profile; and
updating the package profile to include a current location of the package within a distribution facility.

3. The method of claim 1, comprising:
accessing the package profile; and
updating the package profile to include the one or more images.

4. The method of claim 1, further comprising:
determining, based at least in part on the one or more images, that the package is at least one of a damaged package or a flawed package, wherein the flawed package includes a missing label, an incorrect label, a missing identifier, or an incorrect identifier; and
causing the package to be deposited at a third location different than the first location and the second location, wherein the third location corresponds to disposal of the package, replacement of the package, relocation of the package to a fourth location associated with the incorrect label or the incorrect identifier, or manual inspection.

5. The method of claim 1, further comprising:
determining, based at least in part on the package identity, that the package was improperly placed at the second location; and
causing, based at least in part on the package being improperly placed, the package to be removed from the second location to a third location different than the first location and the second location.

6. The method of claim 1, further comprising transmitting, to a database, an update message comprising at least one of:
the package identity;
a barcode;
one or more dimensions of the package; or
an identifier of the second location.

7. The method of claim 1, wherein determining the package identity further comprises:
generating a three-dimensional (3D) model of the package based at least in part on the one or more images; and
determining the package identity of the package based at least in part on the 3D model.

8. The method of claim 1, further comprising:
generating, based at least in part on the package being transferred from the first location to the second location, a package weight;
accessing the package profile; and
updating the package profile to include package weight.

9. A system comprising:
one or more processors; and
a memory storing one or more instructions that are executable by the one or more processors to perform operations comprising:
monitoring, via one or more sensors associated with a robot, a reference frame that occupies a fixed location relative to a reference joint of the robot;
causing the robot to transfer a package from a first location to a second location;
determining that the package is within the reference frame;
causing, based at least in part on the package being within the reference frame, at least a rotation of the package within the reference frame;
causing the one or more sensors to capture one or more images of the package during the rotation of the package; and
determining a package identity of the package based at least in part on the one or more images by:
generating, based at least in part on the one or more images, dimension information associated with the package;
determining that the dimension information is unique to a package profile associated with the first location; and
determining, based at least in part on the package profile, the package identity for the package.

10. The system of claim 9, wherein determining the package identity further comprises:
detecting, based at least in part on the one or more images, a package identifier on one or more exterior surfaces of the package;
accessing the package profile; and
updating the package profile to include a current location of the package within a distribution facility.

11. The system of claim 9, wherein the operations further comprise transmitting a message comprising the package identity to a remote system.

12. The system of claim 9, wherein the operations further comprise:
determining, based at least in part on the one or more images, that the package is at least one of a damaged package or a flawed package, wherein the flawed package includes a missing label, an incorrect label, a missing identifier, or an incorrect identifier; and
causing the package to be deposited at a third location different than the first location and the second location, wherein the third location corresponds to disposal of the package, replacement of the package, relocation of the package to a fourth location associated with the incorrect label or the incorrect identifier, or manual inspection.

13. The system of claim 9, wherein the operations further comprise:
determining, based at least in part on the package identity, that the package was improperly placed at the second location; and
causing, based at least in part on the package being improperly placed, the package to be removed from the second location to a third location different than the first location and the second location.

14. The system of claim 9, wherein the operations further comprise:
accessing the package profile; and
updating the package profile to include the one or more images.

15. The system of claim 9, wherein the operations further comprise:
generating, based at least in part on the package being transferred from the first location to the second location, a package weight;
accessing the package profile; and
updating the package profile to include the package weight.

16. A system comprising:
a robot comprised of a first joint and a final joint that are connected via one or more connecting joints, a vacuum nozzle or a grasping mechanism of the robot configured to remove a package from a storage container at a first physical location and deposit the package onto a conveyor belt at a second physical location that is different than the first physical location, the final joint configured to rotate the package in a direction while the robot is moving the package from the storage container to the conveyor belt;
a first sensor attached to the first joint and configured to detect packages within a volume of space from a first perspective;
a second sensor attached to the first joint and configured to detect the packages within the volume of space from a second perspective that is different than the first perspective; and
a control system configured to:
determine that the final joint and the package are within the volume of space;
cause the final joint to complete one or more rotations of the package within the volume of space as the robot moves the package from the storage container to the conveyor belt;
receive, from the first sensor and the second sensor, multiple images that depict the package within the volume of space in different orientations;
identify, based on the multiple images, a barcode on an exterior surface of the package;
determine, based on the multiple images, dimensions of the package; and
determine, based on at least one of the barcode or the dimensions, an identity of the package.

17. The system as recited in claim 16, wherein:
the first joint is configured to cyclically rotate between a first position at which the robot is aligned with the storage container and a second position at which the robot is aligned with the conveyor belt;
the one or more connecting joints are configured to, while the first joint is in the first position, lower the final joint from a rest position into the storage container and to return to the rest position once the vacuum nozzle or the grasping mechanism has secured the package; and
the one or more connecting joints are configured to, while the first joint is in the second position, lower the final joint from the rest position to deposit the package onto the conveyor belt and return to the rest position.

18. The system as recited in claim 17, wherein:
the first sensor is positioned above the package while the final joint is in the rest position and is holding the package;

the first sensor is configured to capture one or more first images from the first perspective that depict a top surface and one or more side surfaces of the package within the volume of space;

the second sensor is positioned below the package while the final joint is in the rest position and is holding the package; and the second sensor is configured to capture one or more second images that depict a bottom surface and the one or more side surfaces of the package within the volume of space.

19. The system as recited in claim 17, wherein:

the first sensor and the second sensor are positioned such that the volume of space encompasses the final joint in the rest position;

the first sensor and the second sensor are mounted to the first joint such that, as the first joint rotates between the first position and the second position, the volume of space follows the package and the final joint while the first joint moves between the first position and the second position; and the final joint completes the one or more rotations of the package while the first joint is rotating from the first position to the second position.

20. The system as recited in claim 16, wherein the control system is further configured to transmit, to a database associated with the system, an update message including the identity of the package, the barcode, the dimensions, and a system identifier that identifies a current location of the package within a distribution facility.

* * * * *